United States Patent
Simcik et al.

(10) Patent No.: US 10,589,960 B2
(45) Date of Patent: Mar. 17, 2020

(54) USER DEVICE INCLUDING SECONDARY-TOUCH ELEVATOR SERVICE REQUEST INTERFACE

(71) Applicant: Otis Elevator Company, Farmington, CT (US)

(72) Inventors: Paul A. Simcik, Southington, CT (US); Emily Baldi, East Hartford, CT (US); Paul Sieka, New York, NY (US); Matt Anderson, New York, NY (US); Chris Sukovich, New York, NY (US); Staci Weixlmann, New York, NY (US); Sheryl Brothers, Wethersfield, CT (US); Harrison Daniels, Simsbury, CT (US); Kelly Martin Dubois, Unionville, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 411 days.

(21) Appl. No.: 15/665,124

(22) Filed: Jul. 31, 2017

(65) Prior Publication Data
US 2019/0031467 A1 Jan. 31, 2019

(51) Int. Cl.
*B66B 1/34* (2006.01)
*G06F 3/0482* (2013.01)
(Continued)

(52) U.S. Cl.
CPC .......... *B66B 1/3461* (2013.01); *B66B 1/3423* (2013.01); *B66B 1/468* (2013.01);
(Continued)

(58) Field of Classification Search
CPC ..... B66B 1/3461; B66B 1/3423; B66B 1/468; G06F 3/0482
(Continued)

(56) References Cited

U.S. PATENT DOCUMENTS

| 7,404,471 B2 | 7/2008 | Felder |
| 7,711,565 B1 * | 5/2010 | Gazdzinski ............... B66B 3/00 187/396 |

(Continued)

FOREIGN PATENT DOCUMENTS

| EP | 2159183 A1 | 3/2010 |
| EP | 2698774 A1 | 2/2014 |

(Continued)

OTHER PUBLICATIONS

Anonymous, "Samsung Files Patent for 3D Touch Copycat Feature while Apple looks to Challenge the Galaxy Note for Pros" Sep. 25, 2016, URL <https://www.patentlyapple.com/patently-apple/2016/09/samsung-files-patent-for-3d-touch-copycat-feature-while-apple-looks-to-challenge-the-galaxy-note-7-for-pros.html> (7 pages).

(Continued)

*Primary Examiner* — David S Warren
(74) *Attorney, Agent, or Firm* — Cantor Colburn LLP

(57) ABSTRACT

An elevator control system includes an elevator system with at least one elevator car configured to travel to a plurality of floors. An electronic controller controls the elevator system to deliver the elevator car to a given floor in response to an elevator car request. A mobile user includes a display screen and is installed with a secondary-touch detection system that detects a first touch action applied to the display screen and a second touch action applied to the display screen. The mobile user device launches a full service request user interface in response to detecting the first touch action, and performs at least one of launching a pop-up service request user interface and automatically communicates the elevator car request to the controller in response to detecting the second touch action.

20 Claims, 18 Drawing Sheets

(51) Int. Cl.
*G06F 3/0488* (2013.01)
*B66B 1/46* (2006.01)
(52) U.S. Cl.
CPC ........ *G06F 3/0482* (2013.01); *G06F 3/04883* (2013.01); *B66B 2201/4653* (2013.01); *G06F 2203/04803* (2013.01)
(58) Field of Classification Search
USPC .......................................................... 187/389
See application file for complete search history.

(56) References Cited

U.S. PATENT DOCUMENTS

| | | | |
|---|---|---|---|
| 8,136,636 B2 | 3/2012 | Bahjat | |
| 8,336,678 B2 | 12/2012 | Poutiainen | |
| 8,619,051 B2 | 12/2013 | Lacroix | |
| 8,659,571 B2 | 2/2014 | Birnbaum | |
| 8,763,762 B2 | 7/2014 | Finschi | |
| 8,773,356 B2 | 7/2014 | Martin | |
| 8,922,523 B2 | 12/2014 | Lynch | |
| 8,952,987 B2 | 2/2015 | Momeyer | |
| 9,116,569 B2 | 8/2015 | Stacy | |
| 9,262,002 B2 | 2/2016 | Momeyer | |
| 9,561,931 B2 | 2/2017 | Kauppinen | |
| 9,624,071 B2* | 4/2017 | Hanvey | B66B 1/463 |
| 10,294,069 B2* | 5/2019 | King | B66B 1/2491 |
| 2015/0097791 A1 | 4/2015 | Lisseman | |
| 2015/0242037 A1 | 8/2015 | Pedder | |
| 2015/0246790 A1 | 9/2015 | Hiltunen | |
| 2015/0314986 A1 | 11/2015 | Schwarzentruber | |
| 2016/0033342 A1 | 2/2016 | Lyon | |
| 2016/0090270 A1 | 3/2016 | Wang | |
| 2016/0347578 A1 | 12/2016 | Simcik | |
| 2017/0313546 A1* | 11/2017 | King | B66B 1/2491 |
| 2019/0031467 A1* | 1/2019 | Simcik | B66B 1/3461 |
| 2019/0112152 A1* | 4/2019 | Kujala | B66B 5/0018 |
| 2019/0324568 A1* | 10/2019 | Nam | H04M 1/72563 |

FOREIGN PATENT DOCUMENTS

| | | |
|---|---|---|
| EP | 3163254 A1 | 5/2017 |
| WO | 2014116182 A1 | 7/2014 |
| WO | 2016036472 A1 | 3/2016 |
| WO | 2016124810 A1 | 8/2016 |
| WO | 2016188552 A1 | 12/2016 |
| WO | 2017059882 A1 | 4/2017 |
| WO | 2017112659 A1 | 6/2017 |

OTHER PUBLICATIONS

Apple Inc., "Getting Started with 3D Touch" Sep. 13, 2016, URL <https://developer.apple.com/library/archive/documentation/UserExperience/Conceptual/Adopting3DTouchOniPhone/> (4 pages).
George Tinari, "5 apps that showcase 3D Touch's true potential" Sep. 28, 2015, URL <https://www.cultofmac.com/390456/3d-touch-apps/> (8 pages).
Hannah Schilling, "Forcy gives any iPhone the 3D feel" Dec. 1, 2015, Tech News, URL <https://theamericangenius.com/tech-news/forcy-gives-any-iphone-the-3d-feel/> (3 pages).
Molly McHugh, "Yes, There Is a Difference Between 3D Touch and Force Touch" WIRED, Sep. 9, 2015, URL <https://www.wired.com/2015/09/what-is-the-difference-between-apple-iphone-3d-touch-and-force-touch/> (3 pages).
Search Report for European Application No. 18186621.1; Application Filing Date Jul. 31, 2018; dated Dec. 7, 2018 (9 pages).

* cited by examiner

USER DEVICE INCLUDING SECONDARY-TOUCH ELEVATOR SERVICE REQUEST INTERFACE

BACKGROUND

The subject matter disclosed herein generally relates to elevator service request systems, more particularly, to mobile user devices configured to perform elevator service requests.

Contemporary mobile applications provide a means of requesting elevator services by pointing and clicking items on a display of a mobile device smartphone. By clicking on App icons, the corresponding software app is fully launched and the user can select and navigate among several menu items. The fully launched App, however, may include several different screens of which the user must navigate in order to find one or more desired features.

BRIEF DESCRIPTION

Disclosed is an elevator control system including an elevator system with at least one elevator car configured to travel to a plurality of floors. An electronic controller controls the elevator system to deliver the elevator car to a given floor in response to an elevator car request. A mobile user includes a display screen and is installed with a secondary-touch detection system that detects a first touch action applied to the display screen and a second touch action applied to the display screen. The mobile user device launches a full service request user interface in response to detecting the first touch action, and performs at least one of launching a pop-up service request user interface and automatically communicates the elevator car request to the controller in response to detecting the second touch action.

According to one or more additional features, the first touch action is at least one of touching and releasing of the display screen, and a first pressure force applied to the display screen that is less than or equal to a pressure force threshold, and the second touch action is a second pressing force applied to the display screen that exceeds the pressure force threshold.

According to one or more additional features, the first touch action is at least one of touching and releasing of the display screen, and a touch applied to the display screen that is less than or equal to a touching time threshold, and the second touch action is a touch applied to the display screen that exceeds the touch time threshold.

According to one or more additional features, the pop-up service request user interface is displayed on a partial area of the display screen.

According to one or more additional features, a first total area of the pop-up service request user interface is less than a second total area of the display screen.

According to one or more additional features, the pop-up service request user interface lists at least one previously selected destination floor among the plurality of floors.

According to one or more additional features, the controller commands the requested elevator car to a previously selected destination floor selected by the user via the pop-up service request user interface.

According to one or more additional features, the controller is in signal communication with a security device, and the pop-up service request user interface displays a selectable security disarming graphical indicator.

According to one or more additional features, the mobile device sends a disarm request to disarm the security device in response to selecting the security disarming graphical indicator from the pop-up service request user interface, and the controller outputs a disarm command signal that automatically disarms the security device in response to receiving the disarm request.

According to one or more additional features, the controller automatically receives a current floor location of the mobile user device, and the mobile user device requests delivery of the at least one elevator car to the current floor location in response to detecting the second touch action.

According to one or more additional features, a most recent destination floor is detected by the mobile user device, and the current floor location is automatically set to the most recent destination floor in response to launching the pop-up service request user interface.

According to one or more additional features, the mobile device is at least one of a smart phone and a smart wearable device.

Also disclosed is a mobile user device comprising a display screen, and a secondary-touch detection system that detects a first touch action applied to the display screen and a second touch action applied to the display screen. The mobile user device launches a full service request user interface in response to detecting the first touch action, and in response to detecting the second touch action performs at least one of launching a pop-up service request user interface and automatically communicating an elevator car request to a controller configured to command delivery of at least one elevator car to a given floor among the plurality.

According to one or more features, the first touch action is at least one of touching and releasing the of display screen, and a first pressure force applied to the display screen that is less than or equal to a pressure force threshold, and the second touch action is a second pressing force applied to the display screen that exceeds the pressure force threshold.

According to one or more features, the first touch action is at least one of touching and releasing of the display screen, and a touch applied to the display screen that is less than or equal to a touching time threshold, and wherein the second touch action is a touch applied to the display screen that exceeds the touch time threshold.

According to one or more features, the pop-up service request user interface is displayed on a partial area of the display screen, and the pop-up service request user interface displays at least one previously selected destination floor among the plurality of floors.

According to one or more features, the displayed at least one previously selected destination floor is based on a current location of the mobile user device.

According to one or more features, the mobile device displays a first previously selected floor included in a first building when the mobile device is located at a first geographical location, and the mobile device displays a second previously selected floor included in a second building when the mobile device is located at a second geographical location different from the first geographical location.

According to one or more features, the mobile user device determines the first and second geographical locations based on at least one of global satellite position (GPS) information and a location acknowledgement (ACK) signal output from an elevator controller included in the first and second buildings.

According to yet another non-limiting embodiment, A method of communicating an elevator car request comprises physically touching a display screen installed on an electronic mobile device, and detecting, via a secondary-touch detection system installed on the mobile user device, at least one of a first touch action applied to the display screen and a second touch action applied to the display screen. The method further includes launching, via an electronic controller installed on the mobile device, a full service request user interface in response the first touch action. The method further includes performing at least one of launching, via the controller, a pop-up service request user interface and automatically communicating, via the controller, the elevator car request to an electronic elevator controller configured to command delivery of an elevator car to a requested floor among a plurality floors according elevator car request.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
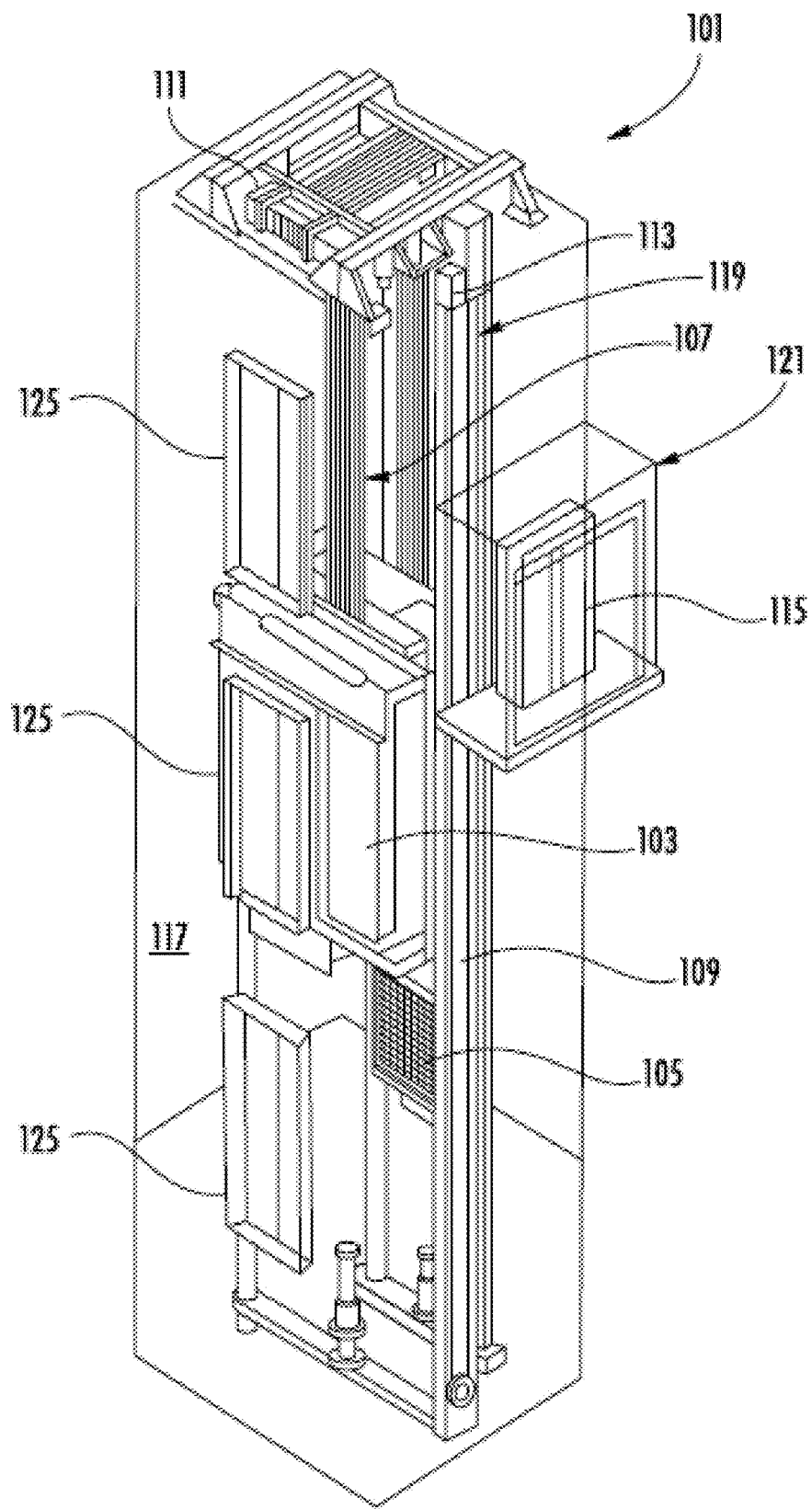
FIG. 1 is a schematic illustration of an exemplary elevator system that may employ various embodiments of the present disclosure.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Various non-limiting embodiment described herein provide a mobile user device that includes a secondary-touch action interface. The secondary-touch action interface allows a user to display a pop-up user interface in response to applying a secondary-touch action to a touch-screen display installed on the mobile user device. The secondary-touch action includes a "force touch" (i.e., when a pressure force applied to the display screen exceeds a force threshold) or a "long-press" (i.e., when a time period during which a user touches the display screen exceeds a time period threshold).

In at least one non-limiting embodiment, the secondary-touch action interface displays a pop-up service request user interface in response to detecting a secondary-touch action. The pop-up service request user interface presents the user with a condensed menu including key features of the App including, for example, elevator floor destinations, security device disarming controls, etc. The user can select the desired feature from the pop-up menu (e.g., an elevator car request for delivery to a selected destination floor), and the selected operation is made without the user needing to fully launch the App, and without the need to navigate among multiple different screens and/or menus.

With reference now to FIG. 1, a perspective view of an elevator system 101 is illustrated according to a non-limiting embodiment. The elevator system 101 includes an elevator car 103, a counterweight 105, a rope system 107, a guide rail 109, a machine 111, a position encoder 113, and a controller 115. The elevator car 103 and counterweight 105 are connected to each other by the rope system 107. The rope system 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

Ropes included in the rope system 107 engage the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position encoder 113. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor.

Although shown and described with a rope system 107, elevator systems that employ other methods and mechanisms of moving an elevator car within an elevator shaft, including ropeless elevator systems and/or elevator systems with more than one elevator car in each elevator shaft, may employ embodiments of the present disclosure. FIG. 1 is merely a non-limiting example presented for illustrative and explanatory purposes. It should be appreciated that any elevator system or system configuration may be employed.

Figure 2:
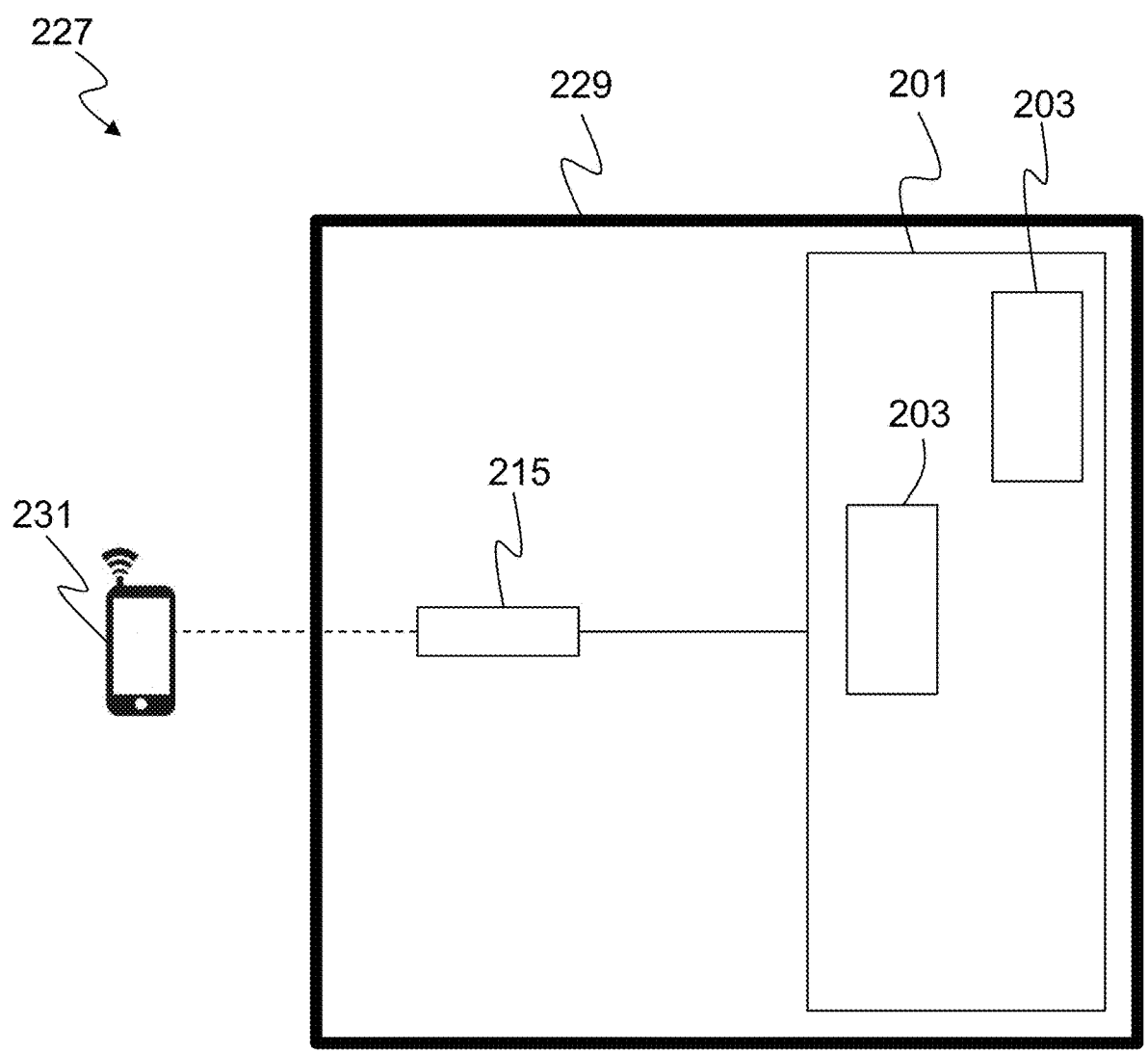
FIG. 2 is a schematic block diagram illustrating a system that may be configured in accordance with one or more embodiments of the present disclosure.

Turning now to FIG. 2, a schematic illustration of an elevator control system 227 in an example embodiment of the present disclosure is shown. The elevator control system 227 includes an elevator system 201 installed within a structure 229 (e.g., a building). In some embodiments, the structure 229 may be an office building or a collection of office buildings that may or may not be physically located near each other. The structure 229 may include any number of floors that are accessible by the elevator system 201 and thus the structure 229 can include any number of landings (e.g., as shown in FIG. 1). Persons entering the structure 229 may enter at a lobby floor, or any other desired floor, and may travel to a destination floor via one or more elevator cars 203 that are part of the elevator system 201.

The elevator system 201 may include one or more computing devices, such as an elevator controller 215. The elevator controller 215 may be configured to control dispatching operations for one or more elevator cars 203 associated with the elevator system 201. The elevator controller 215 may include a processor, memory, and a communication module. Similar to the user device 231, the processor memory, and communication module may be implemented as described above, but as part of the elevator system 201.

It is understood that the elevator system 201 may utilize more than one elevator controller 215, and that each elevator controller may control a group of elevators cars 203. Although two elevator cars 203 are shown in FIG. 2, those of skill in the art will appreciate that any number of elevators cars may be employed in the elevator and building systems that employ embodiments of the present disclosure. The elevator cars 203 can be located in the same hoistway or in different hoistways so as to allow coordination amongst elevator cars 203 in different elevator banks serving different floors (e.g., sky lobbies, etc.). It is understood that the elevator system 201 may include various features as described above with reference to FIG. 1 and may also include other non-depicted elements and/or features as known in the art (e.g., drive, counterweight, safeties, etc.). Moreover, the elevators 203 may be employed in any configuration with all elevators 203 serving all floors of the structure 229, some elevators only serving certain floors, a first group of elevator serving lower floors of a structure 229 and a sky lobby and a second group of elevators serving the sky lobby and upper floors of the structure 229, etc.

Also shown in FIG. 2 is a user device 231, such as a mobile user device (e.g., smart phone, smartwatch, wearable technology, laptop, tablet, etc.). The user device 231 may include a mobile and/or personal device that is typically carried by a person, such as a phone, PDA, etc. The user device 231 may include a processor, memory, and communication module(s). As described below, the processor can be any type or combination of computer processors, such as a microprocessor, microcontroller, digital signal processor, application specific integrated circuit, programmable logic device, and/or field programmable gate array. The memory can be a non-transitory computer readable storage medium tangibly embodied in the user device 231 including executable instructions stored therein, for instance, as firmware. The communication module may implement one or more communication protocols as described in further detail herein, and may include features to enable wireless communication with external and/or remote devices separate from the user device 231. The user device 231 may further include a user interface (e.g., a display screen, a microphone, speakers, input elements such as a keyboard or touch screen, etc.) as known in the art.

Figure 3:
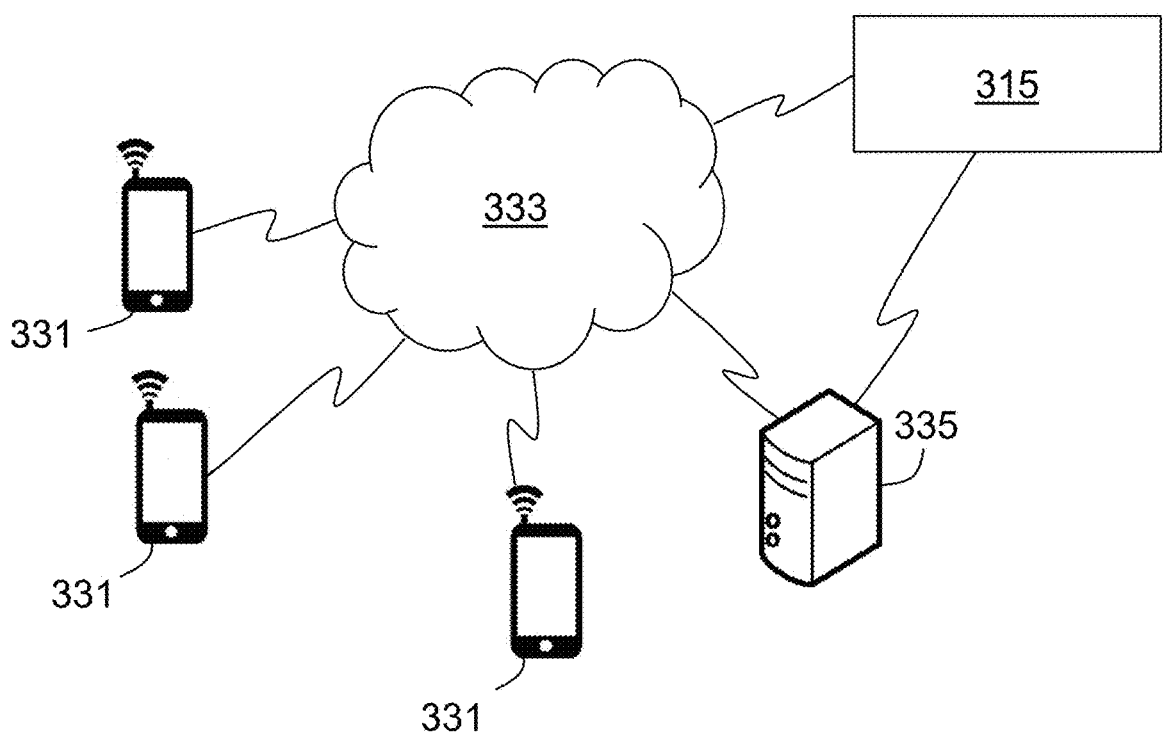
FIG. 3 is a schematic illustration of a system in accordance with an embodiment of the present disclosure.

One or more user devices 331 and an elevator controller 315 in accordance with embodiments of the present disclosure can communicate with one another, e.g., as shown in FIG. 3. For example, one or more user device 331 and the elevator controller 315 may communicate with one another when proximate to one another (e.g., within a threshold distance). In this manner, the elevator controller 315 may send an acknowledgement signal (ACK) acknowledging signal communication with one more nearby mobile devices 331. The ACK signal can also provide the mobile devices 331 with identification information including, but not limited to, location information of the elevator system and/or building, along with user information stored in an elevator system data base. The user system can include, for example, previous elevator car requests (i.e., an elevator car request history) and/or previously selected destination floors.

The user device 331 and the elevator controller 315 may communicate over a network 333, that may be wired or wireless. Wireless communication networks can include, but are not limited to, Wi-Fi, short-range radio (e.g., Bluetooth®), near-field infrared, cellular network, etc. In some embodiments, the elevator controller 315 may include, or be associated with (e.g., communicatively coupled to) one or more networked building elements 335, such as computers, kiosks, beacons, hall call fixtures, lanterns, bridges, routers, network nodes, etc. The networked element 335 may also communicate directly or indirectly with the user devices 331 using one or more communication protocols or standards (e.g., through the network 333).

For example, the networked element 335 may communicate with the user devices 331 using near-field communications (NFC) (e.g., network 333) and thus enable communication between the user devices 331 and the elevator controller 315. In some embodiments, the elevator controller 315 may establish communication with one or more user devices 331 that are outside of the structure/building. Such connection may be established with various technologies including GPS, triangulation, or signal strength detection, by way of non-limiting example. Such technologies that allow communication can provide users and the system(s) described herein more time to perform the described functions. In example embodiments, the user devices 331 communicate with the elevator controller 315 over multiple independent wired and/or wireless networks. Embodiments are intended to cover a wide variety of types of communication between the user devices 331 and the elevator controller 315, and embodiments are not limited to the examples provided in this disclosure.

The network 333 may be any type of known communication network including, but not limited to, a wide area network (WAN), a local area network (LAN), a global network (e.g. Internet), a virtual private network (VPN), a cloud network, and an intranet. The network 333 may be implemented using a wireless network or any kind of physical network implementation known in the art. The user devices 331 and/or the networked devices 335 may be coupled to the elevator controller 315 through multiple networks 333 (e.g., cellular and Internet) so that not all user devices 331 and/or the networked devices 335 are coupled to the elevator controller 315 through the same network 333. One or more of the user devices 331 and the elevator controller 315 may be connected to the network 333 in a wireless fashion. In one non-limiting embodiment, the network 333 is the Internet and one or more of the user devices 331 execute a user interface application (e.g. a web browser) to contact the elevator controller 315 through the network 333.

Embodiments provided herein are direct to apparatuses, systems, and methods for making and fulfilling requests for elevator service. In some embodiments, a request for elevator service may be communicated over one or more lines, connections, or networks, such as network 333, e.g., a request made by a user device 331 and transmitted through the network 333 to the elevator controller 315 to request elevator service. The request for service may be initiated by a mobile device controlled by and/or associated with a user, in a passive or active manner. In some embodiments, the mobile device may be operative in conjunction with a Transmission Control Protocol (TCP) and/or a User Datagram Protocol (UDP). In some embodiments, a request for service may be authenticated or validated based on a location of the user device. In some embodiments, a request for service may be fulfilled in accordance with one or more profiles, such as one or more user or mobile device profiles. In some embodiments the profiles may be registered as part of a registration process. In some embodiments, an elevator system may be registered with a service provider.

As noted, the elevator controller 315 may be associated with an elevator system (e.g., elevator systems 101, 201). The elevator controller 315 may be used to process or fulfill the requests for elevator service that are submitted from one or more user devices 331. The requests for elevator service may be received through the network 333 from the one or more user devices 331 and/or the networked building elements 335, which may be mobile devices, including, but not limited to phones, laptops, tablets, smartwatches, etc. One or more of the user devices 331 may be associated with (e.g., owned by) a particular user. The user may use his/her user device(s) 331 to request elevator service.

For example, a user of a user device 331 may request service in an affirmative or active manner. The user may enter a request for elevator service using an I/O interface of the user device 331, as described herein. That is, in some embodiments, an application, app, or other program may be installed and operated on the user device 331 wherein the user may interact with the app or program to request elevator service.

In other embodiments, or in combination therewith, the user may request elevator service in a passive manner. For example, a profile may be established for the user or the particular user device 331, optionally as part of a registration process with, e.g., a service provider and/or through historical data tracking. The profile may contain a log of the user's history and/or activities, such as where the user has gone or traveled to, the user's preferences, or any other data that may be applicable to the user. In some embodiments, the user profile may be accessed or analyzed to determine the likelihood or probability that the user will request elevator service at a particular moment in time (e.g., a particular day or time of day). Resources may be provisioned or allocated to fulfill the request (e.g., an elevator car request or reservation may be placed) in the event that the probability of requested service, or consumption, or use of an elevator is anticipated.

The request for service may be conveyed or transmitted from the user device 331 through the network 333. For example, the request for service may be transmitted to and/or over the Internet and/or a cellular network. The network(s) 333 may include infrastructure that may be organized to facilitate cloud computing. For example, one or more servers, such as a primary message server, a backup message server, and a device commissioning message server may be employed as part of the network 333.

In some embodiments, the request for service may specify a type of service requested, at any level of detail or abstraction. For example, a first request for service may specify that elevator service is requested, a second request for service may specify one or more of a departure floor and/or a destination floor, and a third request for service may specify that elevator service is desired to accommodate a heavy load (e.g., freight or cargo) with a number of other users or passengers in an amount less than a threshold. In some embodiments, the request for service transmitted from the user device 331 may include an identifier associated with the user or the particular user device 331 in order to allow the elevator controller 315 to distinguish between users and/or user devices 331.

Figure 4A:
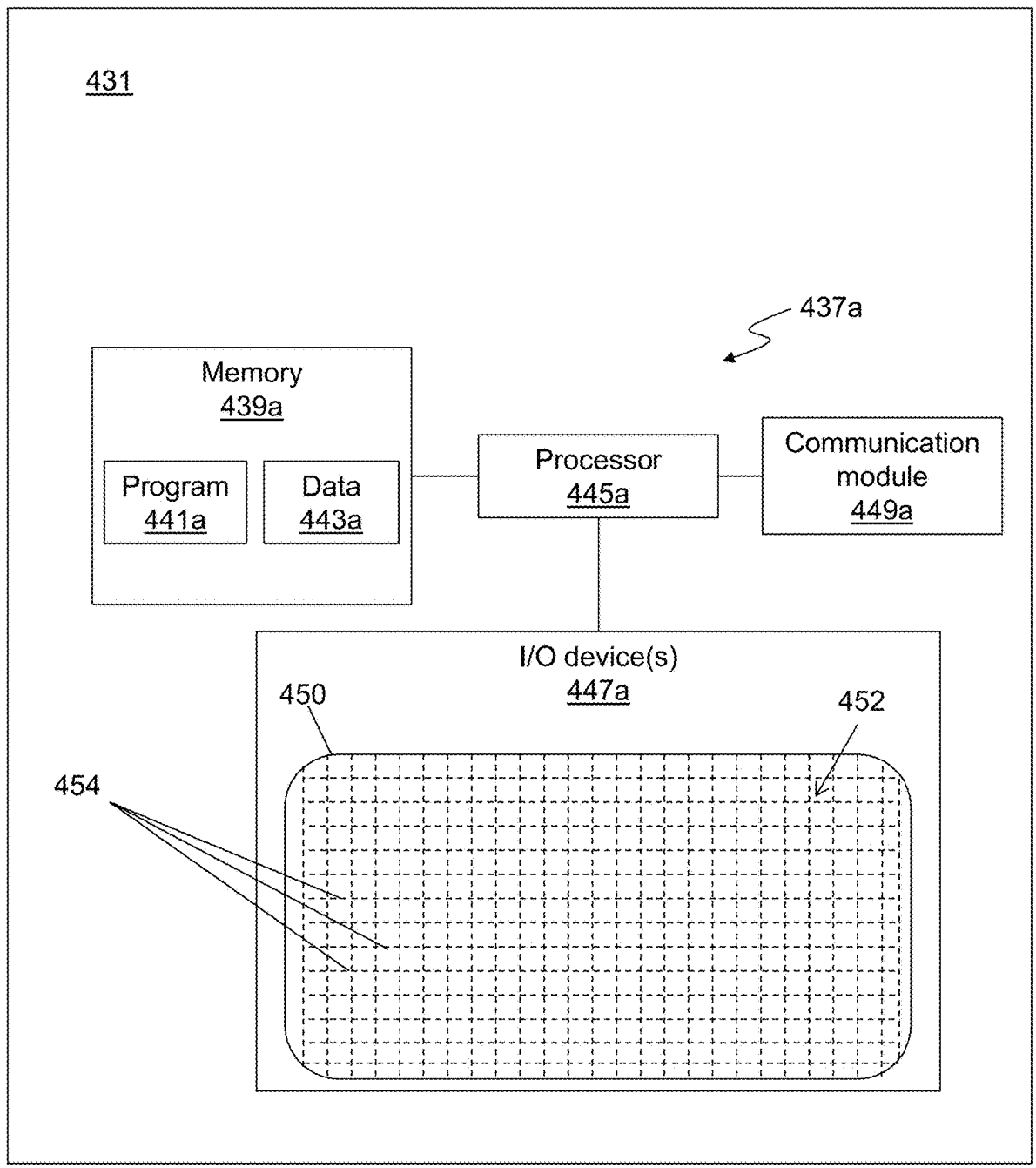
FIG. 4A is a schematic illustration of a computing system of a user device in accordance with an embodiment of the present disclosure.
Figure 4B:
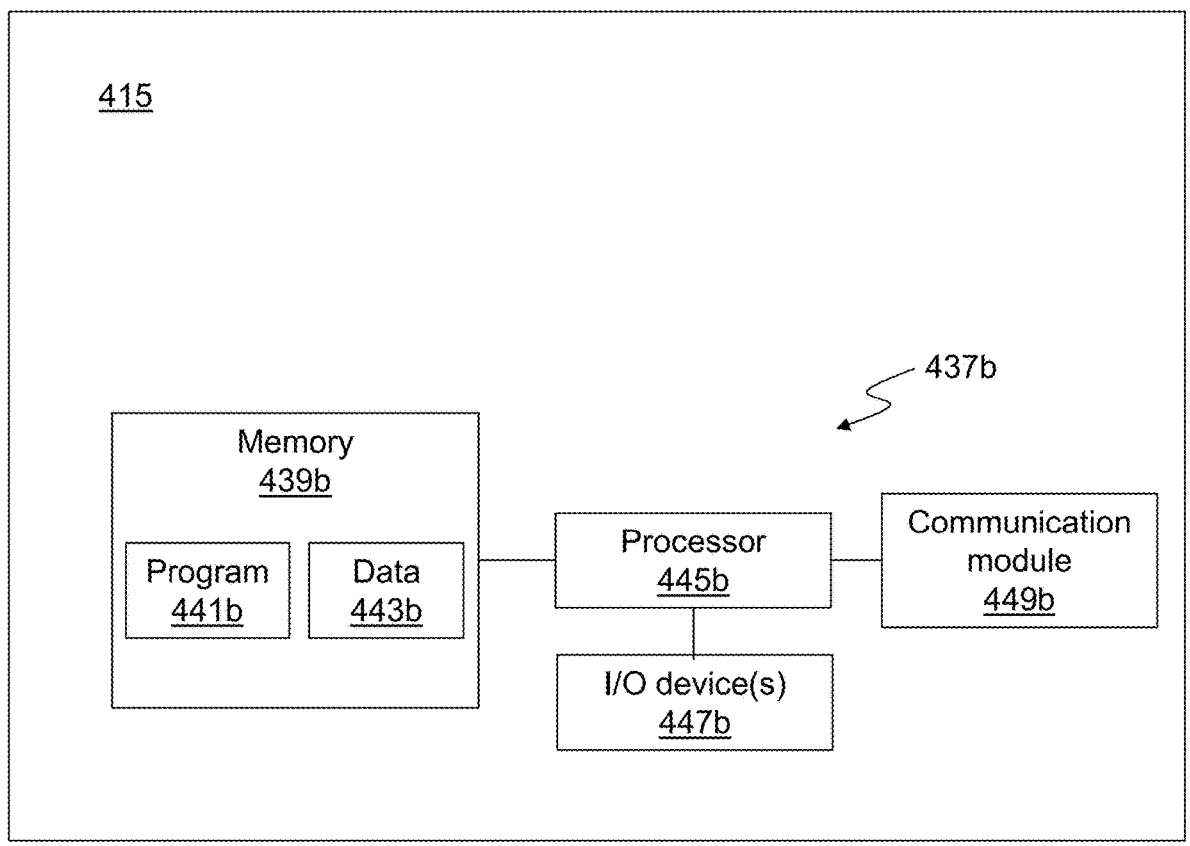
FIG. 4B is a schematic illustration of a computing system of an elevator controller in accordance with an embodiment of the present disclosure.

Referring now to FIGS. 4A and 4B, schematic block diagram illustrations of example computing systems 437a, 437b for a user device 431 and an elevator controller 415, respectively, are shown. The user device 431 can be implemented as various mobile devices including, but not limited to, a smart phone or a smart wearable device such as, for example, a smartwatch. The computing system 437a may be representative of computing elements or components of user devices, networked elements, mobile devices, etc. as employed in embodiments of the present disclosure. The computing system 437b may be representative of computing elements or components of controllers, elevator controller, networked elements, computers, etc. For example, the computing system 437a can be installed in a user device 431, e.g., user device 231, 331 shown above (in addition to mobile user devices 531 and 631 described in greater detail below). The computing system 437a can be configured to operate the user device 431, including, but not limited to, operating and controlling a display screen 450 such as, for example, a touch-screen display 450, to display various output and receive various input from a user's interaction with the touch-screen display 450.

The user device 431 further includes a secondary-touch detection system 452 in signal communication with the processor 445a and the touch-screen display 450. The secondary-touch detection system 452 is configured to detect and distinguish between different touch actions that are physically applied to the display screen 450. In at least one non-limiting embodiment, the secondary-touch detection system 452 includes a plurality of electrodes 454 in signal communication with the touch-screen display 452 to distinguish between taps and harder or more forceful presses. The secondary-touch detection system 452 is also capable of distinguishing between taps and longer presses. The computing system 437a can then execute a specific action or contextually specific control based on the detected pressure force. In this manner, the secondary-touch detection system 454 can detect a first touch action applied to the touch-screen display 450 and a second touch action applied to the touch-screen display 450 different from the first action. The first touch action can be a first pressure force while the second touch action can be a second pressure force that is greater than the first pressure force, vice versa, or any variation thereof. The secondary-touch detection system 452 in conjunction with the processor 445 can also distinguish between a short-press and a long-press based on the time period at which a touch is applied to the touch-screen display 450.

As shown, the computing system 437a includes a memory 439a which may store executable instructions and/or data. The executable instructions may be stored or organized in any manner and at any level of abstraction, such as in connection with one or more applications, apps, programs, processes, routines, procedures, methods, etc. As an example, at least a portion of the instructions are shown in FIG. 4A as being associated with a program 441a. The memory 439a can include RAM and/or ROM and can store the program 441a thereon, wherein the program 441a may be a mobile operating system and/or mobile applications to be used on the user device 431.

Further, the memory 439a may store data 443a. The data 443a may include profile or registration data (e.g., in a user device), a device identifier, or any other type(s) of data. The executable instructions stored in the memory 439a may be executed by one or more processors, such as a processor 445a, which may be a mobile processor in the user device 431. The processor 445a may be operative on the data 443a and/or configured to execute the program 441a. In some embodiments, the executable instructions can be performed using a combination of the processor 445a and remote resources (e.g., data and/or programs stored in the cloud (e.g., remote servers)).

The processor 445a may be coupled to one or more input/output (I/O) devices 447a. In some embodiments, the I/O device(s) 447a may include one or more of a physical keyboard or keypad, display screen 450 such as, for example, a touchscreen or touch panel, a microphone, a speaker, a mouse, a button, e.g., parts or features of a telephone or mobile device (e.g., a smartphone. For example, the I/O device(s) 447a may be configured to provide an interface to allow a user to interact with the user device 431. In some embodiments, the I/O device(s) 447a may support a graphical user interface (GUI) and/or voice-to-text capabilities for the user device 431.

The components of the computing system 437a may be operably and/or communicably connected by one or more buses. The computing system 437a may further include other features or components as known in the art. For example, the computing system 437a may include one or more communication modules 449a, e.g., transceivers and/or devices configured to receive information or data from sources external to the computing system 437a. In one non-limiting embodiments, the communication modules 449a of the user device 431 can include a near-field communication chip (e.g., Bluetooth®, Wi-Fi, etc.) and a cellular and/or satellite data chip, as known in the art. In some embodiments, the computing system 437a may be configured to receive information over a network (wired or wireless), such as network 333 shown in FIG. 3. The information received over the network may be stored in the memory 439a (e.g., as data 443a) and/or may be processed and/or employed by one or more programs or applications (e.g., program 441a).

Referring to FIG. 4B, the computing system 437b can be configured as part of an elevator controller, e.g., elevator controller 115, 215, 315 shown above. The computing system 437b can be a computer or other type of controller that is physically connected or remote from mechanical control of the elevator system. The computing system 437b may be connected to various elements and components within a building that are associated with operation of an elevator system.

The computing system 437a may be used to execute or perform embodiments and/or processes described herein, such as within and/or on user devices. For example, the computing system 437a of the user device 431 enables a user interface to enable a user to make service requests to an elevator. To make such service requests, the user device 431, and the computing system 437a thereof, may communicate with the computing system 437b of the elevator controller 415.

For example, as shown in FIG. 4B, the elevator controller 415 includes a computing system 437b that is used to receive commands and/or instructions (e.g., data) from remote devices, including, but not limited to, the user device 431. The computing system 437b is configured to control operation of and/or reservation of elevator cars within one or more elevator hoistways. The computing system 437b (and program 441b stored thereon) may be configured to process requests for elevator service received from one or more user devices (e.g., user device 431). As part of the processing, the computing system 437b may validate or authenticate the user device 437 such that only certain user devices 431 may be able to communicate and/or make elevator service requests to the elevator controller 415.

As shown, the computing system 437b of the elevator controller 415 includes components similar to that shown and described with respect to the computing system 437a of FIG. 4A. As such, the elevator controller computing system 437b includes a memory 439b with at least one program 441b and data 443b stored thereon. The data 443b may include profile or registration data (e.g., related to user devices), elevator car data, elevator control data and/or programs, or any other type(s) of data associated with control and/or operation of an elevator system. A processor (also referred to as a controller) 445b may be configured to receive service requests through a communication module 449b from one or more user devices 431. The computing system 437b may further include one or more I/O devices 447b, including, but not limited to, control connections to one or more elevator mechanical controls and/or elevator cars. Further, in some configurations, the I/O devices 447b can include a monitor or display screen as part of a user interactive computing system that is associated with the elevator system and/or elevator controller 415.

Turning now to FIGS. 5A-5D, a mobile user device 531 including a secondary-touch service request interface is illustrated in accordance with a non-limiting embodiment of the present disclosure. The mobile user device 531 includes a touch-screen display 550 that can display one or more graphical icons 555a, 555b, 555c, 555d, 555e, and 555f. Each graphical icon 555a-555f corresponds to a respective software application (App) installed on the mobile user device 531. The mobile user device 531 is further configured to detect a physical touch applied to the touch-screen display 550. A given App can be fully launched by touching and releasing the corresponding graphical icon 555a-555f. The touching action can be performed using the user's finger and/or a stylus, for example.

The touch-screen display 550 can work in conjunction with a secondary-touch detection system (see FIG. 4A) installed on the mobile user device 531 to distinguish between different touch actions that are physically applied to the touch-screen display 550 as described above. Accordingly, the mobile user device 531 can execute a specific action or contextually specific control in response to detecting the secondary-touch action.

Figure 5A:
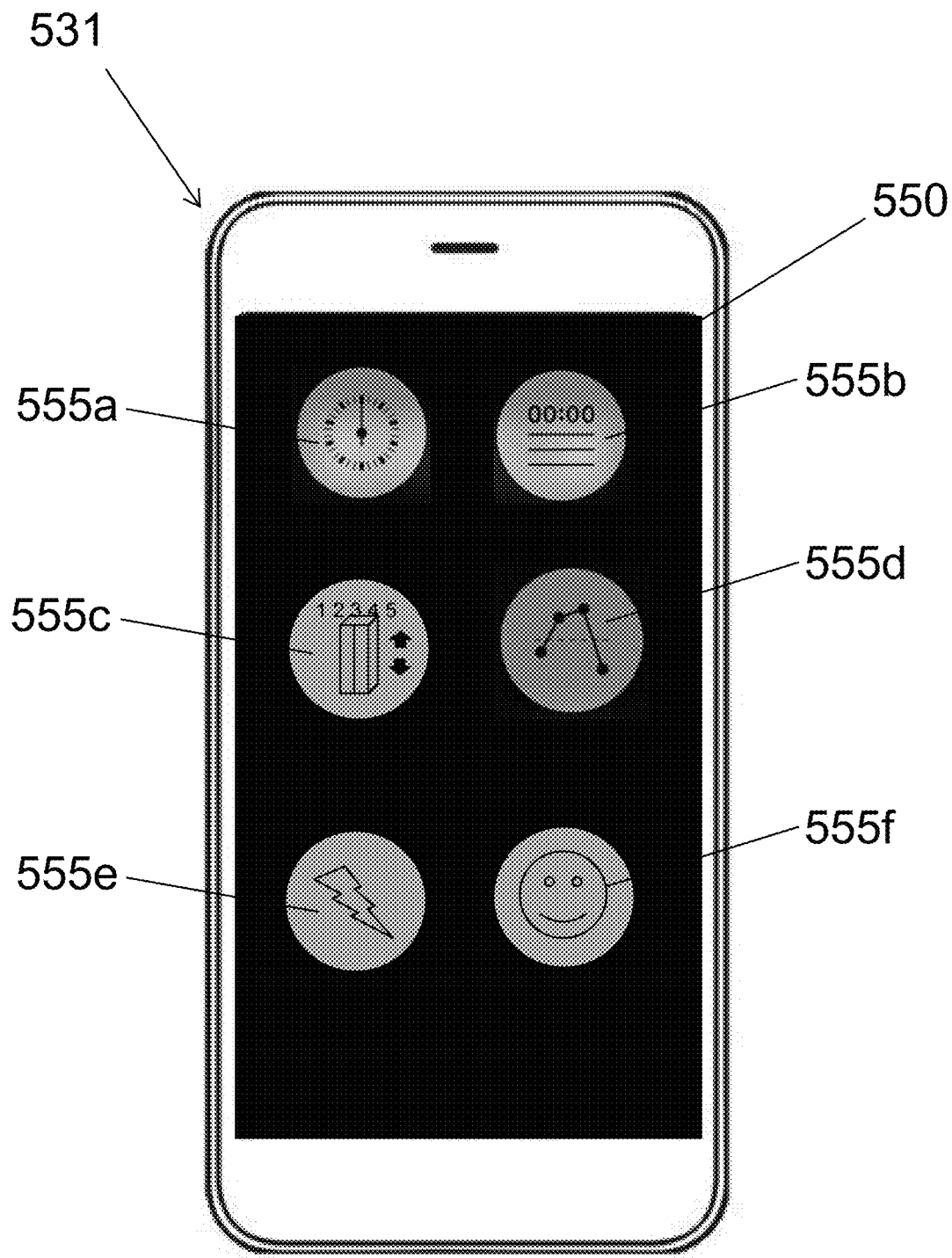
FIG. 5A illustrates a secondary-touch service request interface implemented on a user device according to a non-limiting embodiment.
Figure 5B:
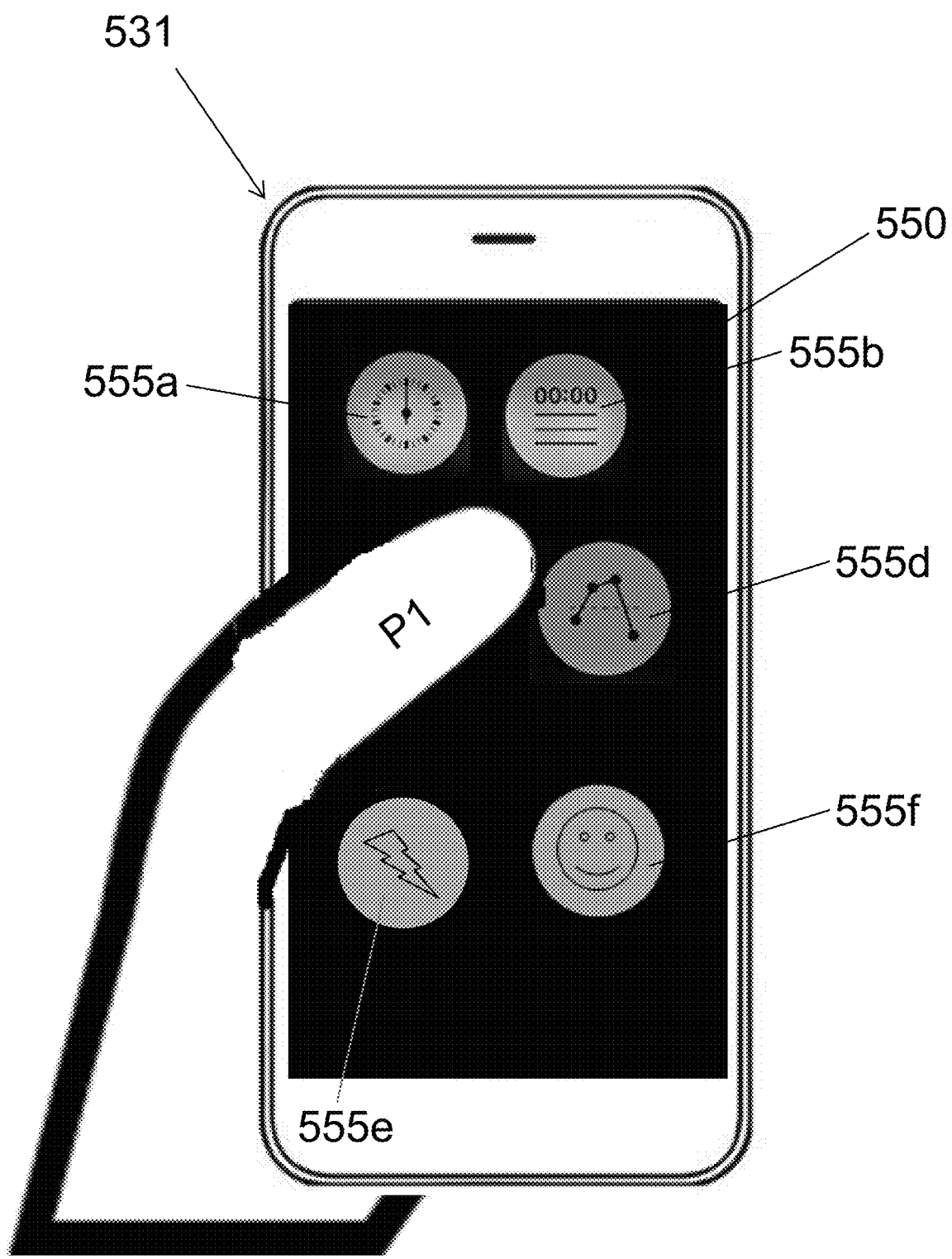
FIG. 5B illustrates the secondary-touch service request interface of FIG. 5A while satisfying a first pressure threshold (e.g., a soft touch) according to a non-limiting embodiment.

Referring to FIG. 5B, for example, a first touching action is applied to the touch-screen display 550 to select graphical icon 555c associated with a building access App installed on the mobile user device 531. The first-touching action is applied with a first pressure force (P1). Although not illustrated, the mobile user device 531 can fully launch the building access App when, for example, the first pressure force (P1) does not exceed a pressure force threshold ($P_{TH}$).

Figure 5C:
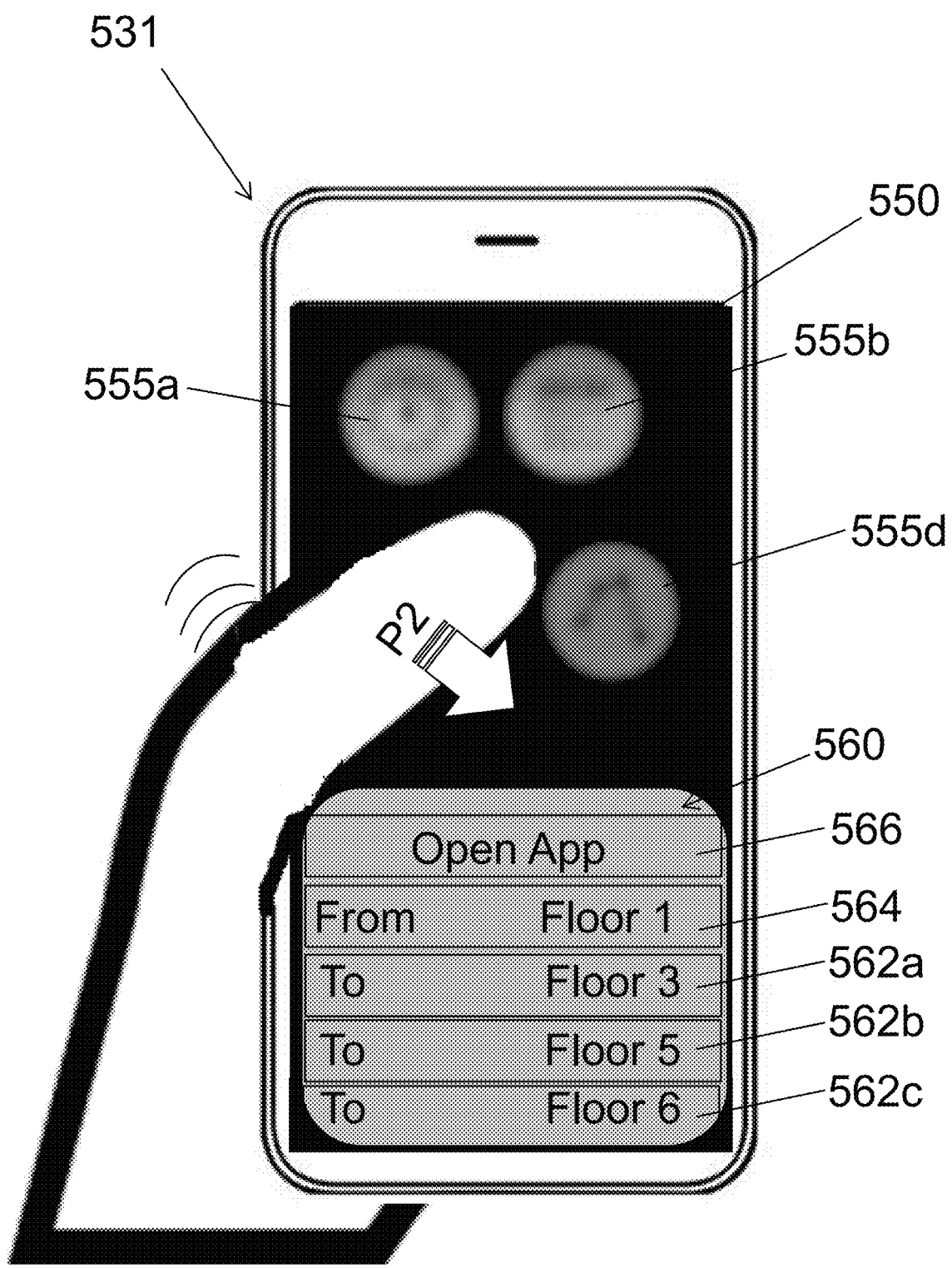
FIG. 5C illustrates an App pop-up interface that is generated after satisfying a second pressure threshold (e.g., a force touch) according to a non-limiting embodiment.

Turning to FIG. 5C, however, the touching action is applied at a greater pressure force (P2) which exceeds $P_{TH}$. Accordingly, the mobile user device 531 detects a secondary-touch action applied to the touch-screen displayed 550. In response to detecting the secondary-touch action, the mobile user device 531 automatically displays a pop-up service request user interface 560 associated with the building access App. Unlike a scenario where the building access App is fully launched, the pop-up service request user interface 560 is displayed on a partial area of the touch-screen display 550. For example, a first total area of the pop-up service request user interface 560 is less than a second total area of the display screen 550. Accordingly, information displayed in the background of the touch-screen display 550 can still be viewed while accessing the pop-up service request user interface 560.

Still referring to FIG. 5C, the pop-up service request user interface 560 is a condensed interface that provides a user with quick access to a limited number features (e.g., key features) of the building access App without the need to fully launch the App. In at least one embodiment, the pop-up service request user interface 560 lists at least one previously selected destination floor 562a, 562b and 562c among the floors of a corresponding elevator system. A user can quickly tap and select a desired floor from the pop-up interface 560, and in response commands the mobile user device to output an elevator car call request to an elevator controller (not shown in FIGS. 5A-5D).

In response to the elevator car request, the elevator controller automatically commands delivery of an elevator car to a pickup floor location 564 (e.g., the current floor location) of the mobile user device 531. In at least one non-limiting, the elevator system is capable of communicating with the user's mobile device 531 and/or short-range communication identification device (e.g., a Radio-frequency identification (RFID) tag) to identify the current location and floor of the user. Altitude sensors installed on the mobile user device 531 may also be used to automatically determine the current 'From' floor. Also, a beacon (Bluetooth) devices could broadcast the current floor location on every floor of the building. The beacon signal would be received by the mobile user device 531 and used to determine the current 'From' floor In another non-limiting embodiment, or to be in combination with other embodiments, the user's most recent destination floor is utilized as the starting floor during the next launch of the pop-up service request user interface 560. For example, when a user travels from Floor 3 to Floor 1, the pop-up service request user interface 560 will list Floor 1 as the starting floor or "From" floor during the next launch of the pop-up service request user interface 560.

If a desired floor is not listed in the pop-up interface 560, a user can tap and select the "Open App" option 566, which causes the mobile user device 531 to fully open the App. At this stage, the user can access the full features of the APP, which includes the ability to allow the user to manually input a pickup or starting floor, i.e., the "From" floor, and to allow the user to select any floor included in the elevator system as a destination floor. In at least one embodiment, the pop-up service request user interface 560 is automatically closed and the full touch-screen display 560 is presented to the user in response to the selecting a delivery floor 562a-562c from the pop-up service request interface 560.

Figure 5D:
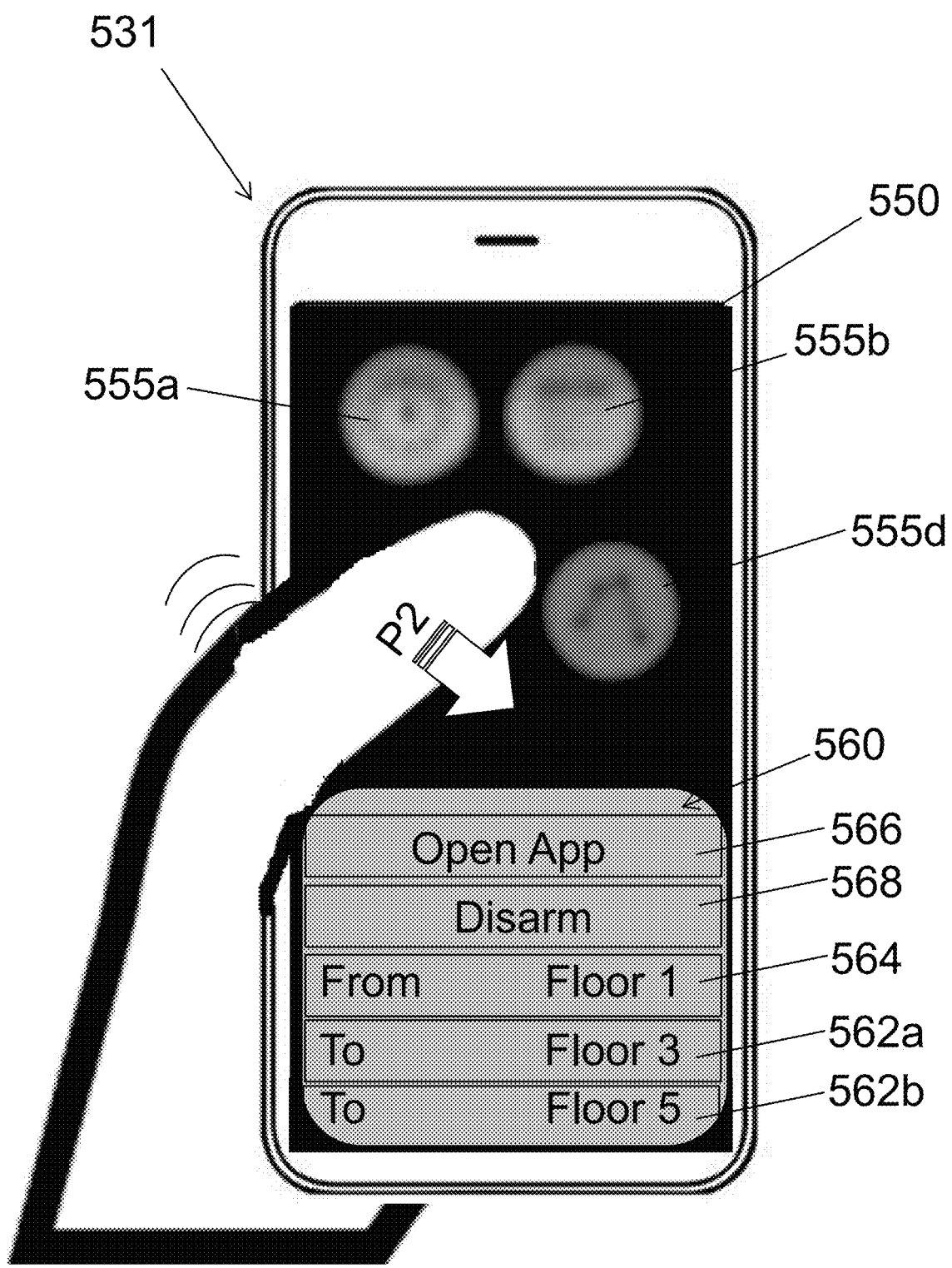
FIG. 5D illustrates an App pop-up interface that is generated after satisfying a second pressure threshold (e.g., a force touch) according to another non-limiting embodiment.

In another non-limiting embodiment illustrated in FIG. 5D, the pop-up service request user interface 560 can also list a "Disarm" option, which allows a user to disarm one or more security devices. For example, selecting the "Disarm" option from the pop-up service request user interface 560 causes the mobile user device 531 to output a disarm request signal to a controller installed in a building such as an apartment complex, workplace building, etc. In response to the disarm request, the controller can output a control signal which disarms one or more security devices. For instance, the controller can output a disarm control signal which unlocks one or more doors of the building.

In at least one embodiment, the "Disarm" operation 568 can be performed in conjunction with an elevator call request. For example, a user approaching a building can perform a second-touch action to display the pop-up service request user interface 560. The user can then select the "Disarm" option 568, which unlocks an entryway door or garage door of the building, and also automatically calls an elevator car to a pickup destination floor such as, for example, the parking garage or lobby. In at least one embodiment, the secondary-touch service request interface of the mobile user device 531 can automatically perform both the security device disarm operation and the elevator car request operation by simply performing a second-touch action without the need to access the pop-up service request user interface 560. In this manner, a user can utilize the pop-up service request user interface 560 to conveniently access a particular building.

Figure 6A:
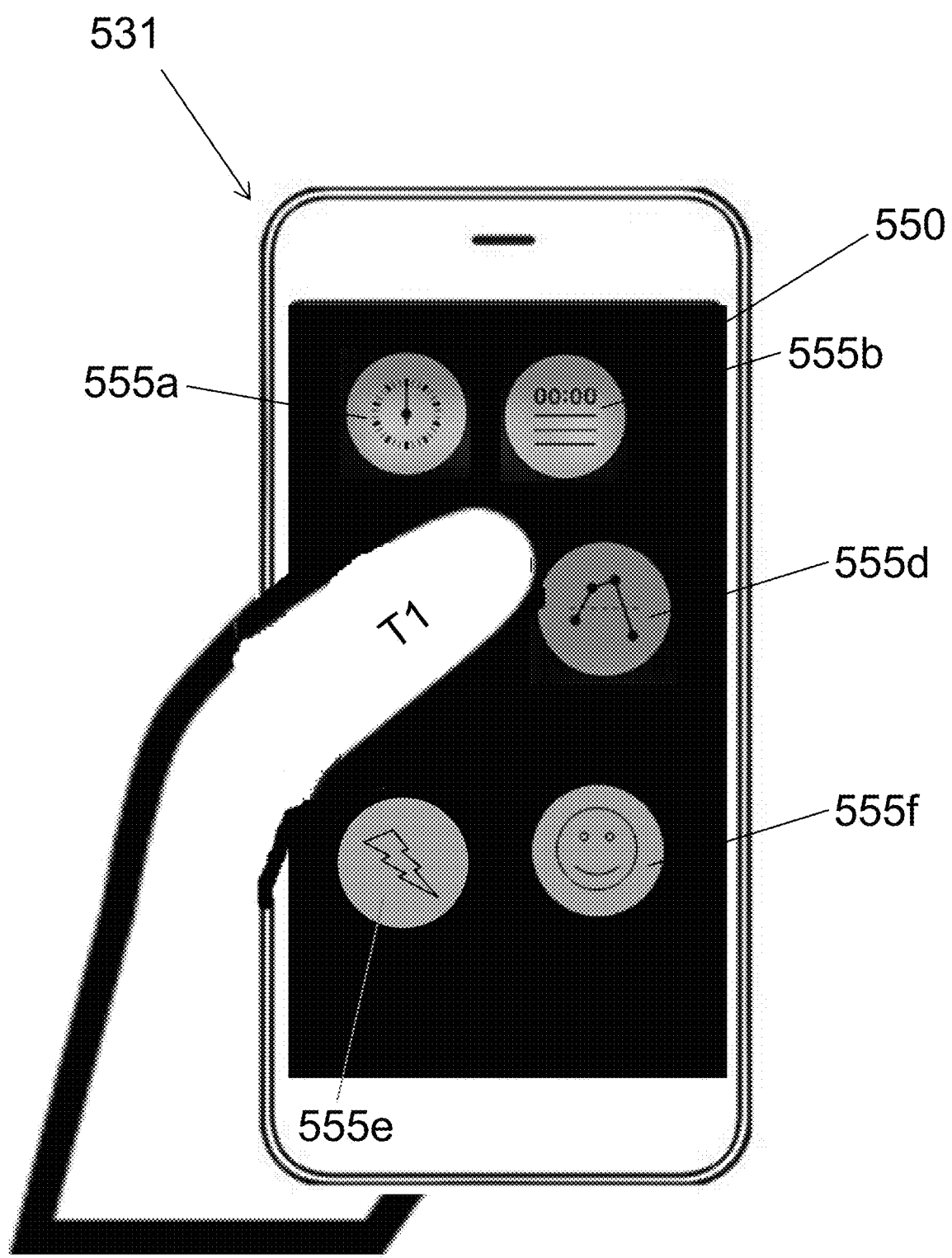
FIG. 6A illustrates the secondary-touch service request interface of FIG. 5A while satisfying a first timed-press threshold (e.g., a short press) according to a non-limiting embodiment.
Figure 6B:
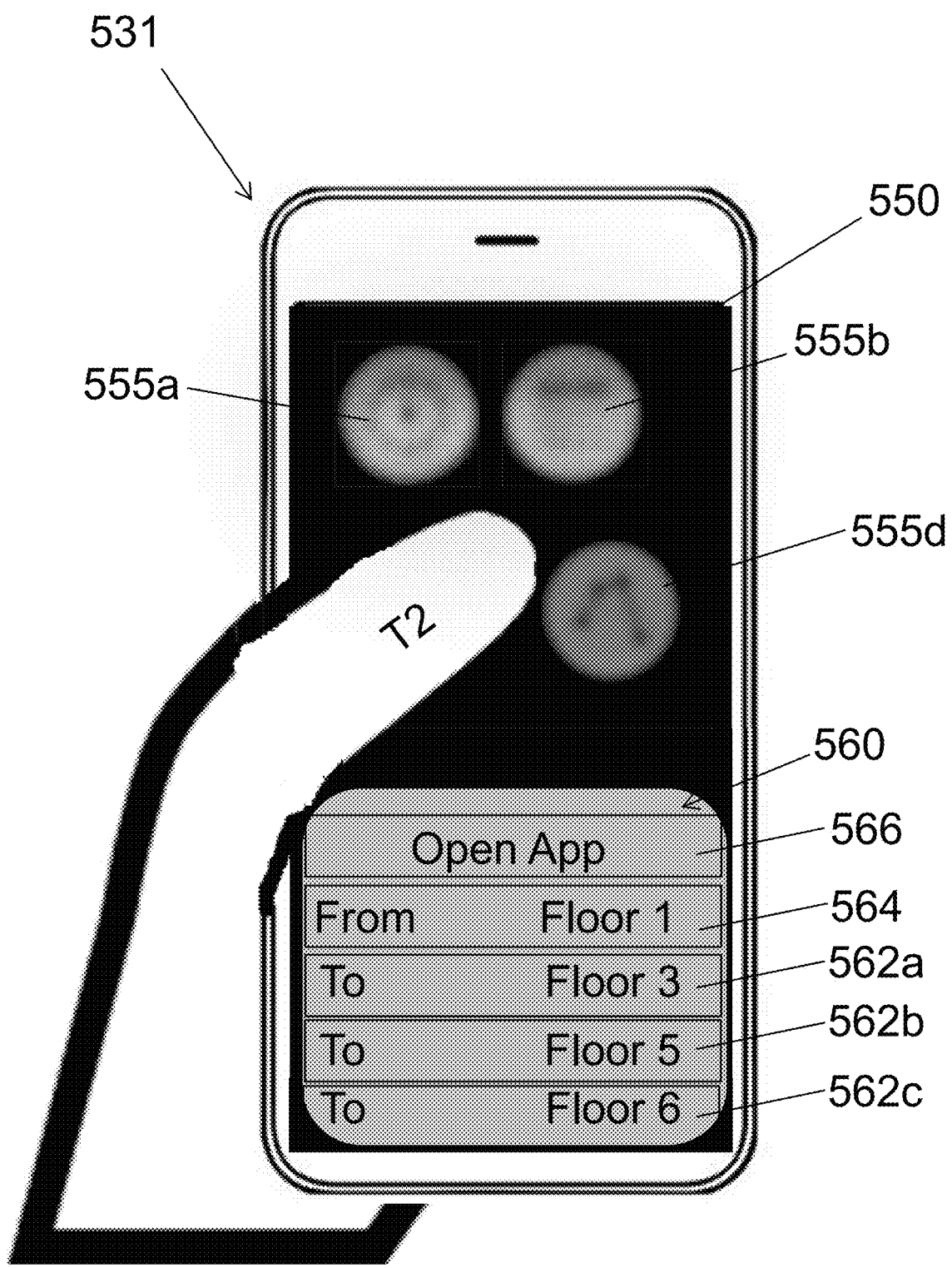
FIG. 6B illustrates an App pop-up interface that is generated after satisfying a second timed-press threshold (e.g., a long press) according to a non-limiting embodiment.

Turning to FIGS. 6A and 6B, a mobile user device 531 including a secondary-touch service request interface is illustrated in accordance with another non-limiting embodiment of the present disclosure. The secondary-touch service request interface operates in a manner similar to that described above. However, the secondary-touch action is achieved using a long-press as opposed to a force touch. Referring to FIG. 6A, for example, a first touching action is applied to the touch-screen display 550 to select the graphical icon 555c associated with the building access App. The first-touching action is applied for a first time period (T1). Although not illustrated, the mobile user device 531 can launch the full building access App if, for example, contact with the display 550 is released before exceeding a time period threshold ($T_{TH}$).

Turning to FIG. 6B, however, the touch (i.e., contact) with the touch-screen display 550 is maintained for an extended time period (T2) which exceeds $T_{TH}$. Accordingly, the mobile user device 531 detects a secondary-touch action (i.e., a long-press) applied to the touch-screen displayed 550. In response to detecting the long-press, the mobile user device 531 automatically displays the pop-up service request user interface 560 associated with the building access App. The user can then perform various operations provided by the building access App as described in detail above.

Figure 7A:
FIG. 7A illustrates a secondary-touch service request interface implemented on a user device according to another non-limiting embodiment.
Figure 7B:
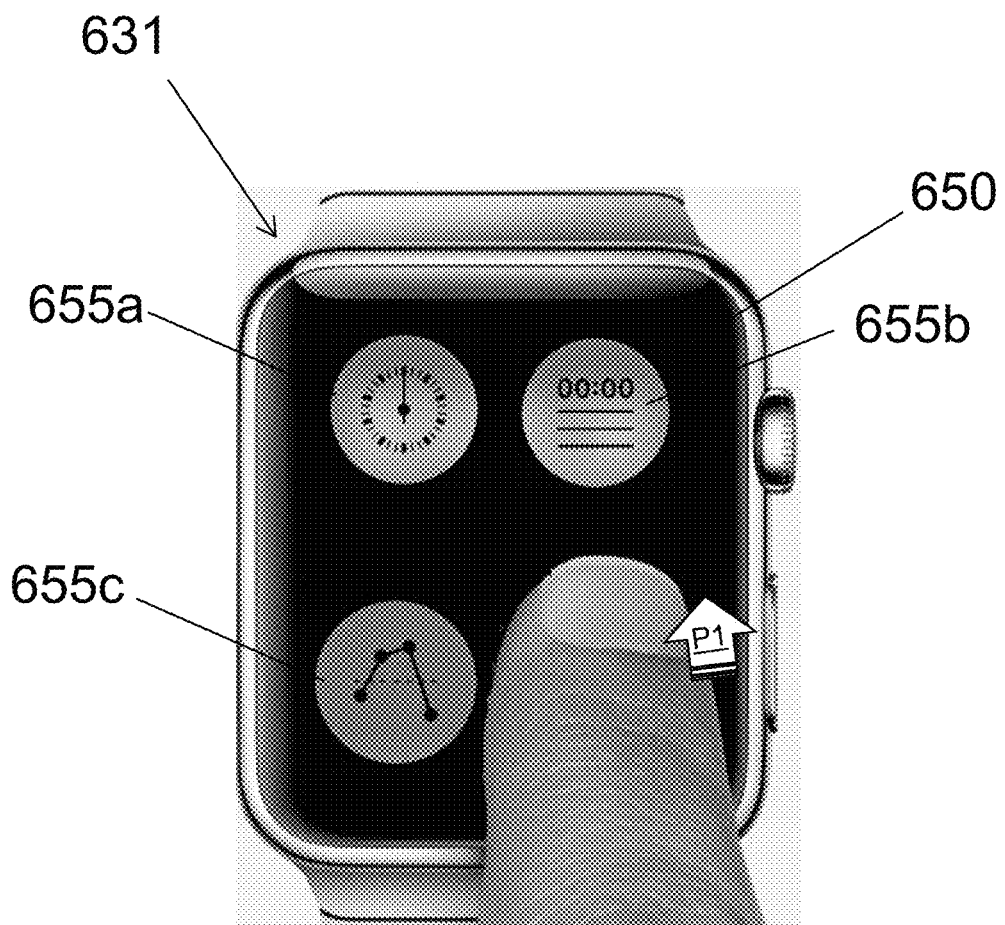
FIG. 7B illustrates the secondary-touch service request interface of FIG. 7A while satisfying a first pressure threshold (e.g., a soft touch) according to a non-limiting embodiment.
Figure 7C:
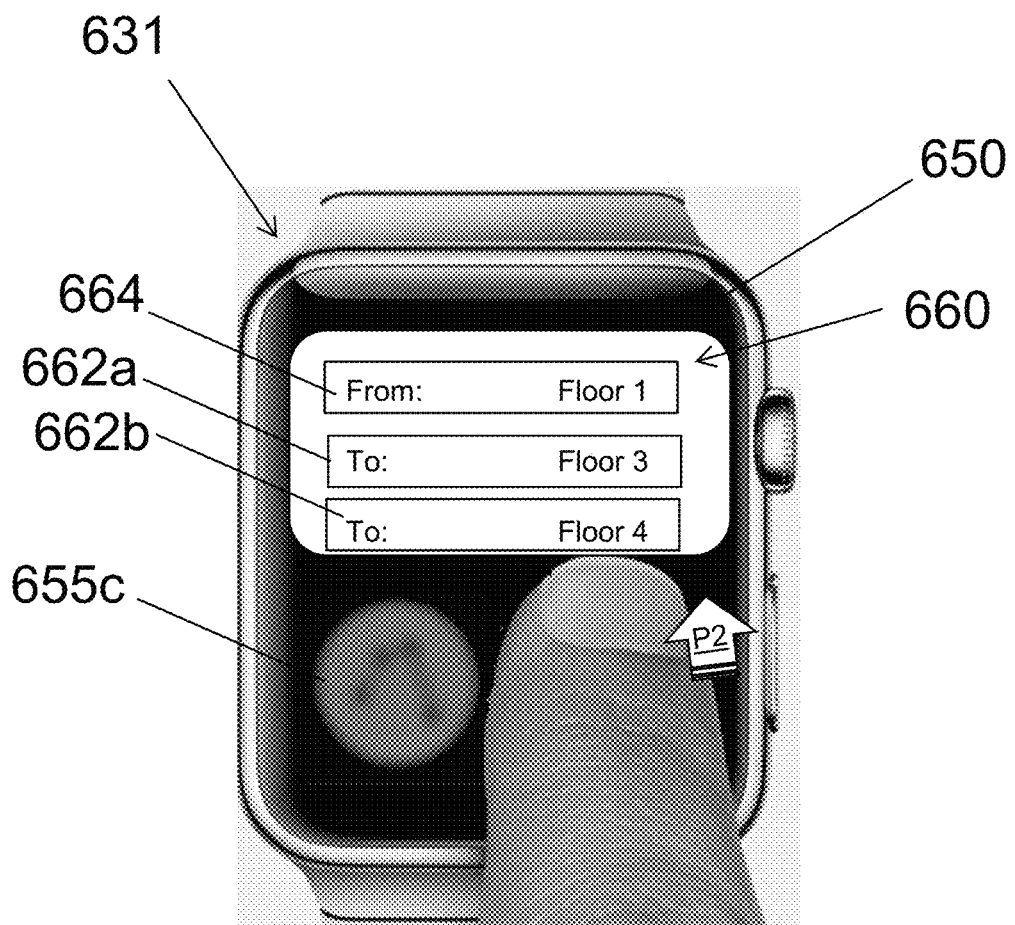
FIG. 7C illustrates the secondary-touch service request interface of FIG. 7A while satisfying a second pressure threshold (e.g., a force touch) according to a non-limiting embodiment.

Turning to FIGS. 7A-7C, a mobile user device 631 including a secondary-touch service request interface is illustrated in accordance with another non-limiting embodiment of the present disclosure. The mobile user device 631 and secondary-touch action interface operate as described above with respect to FIGS. 5A-5D. In this embodiment, however, the mobile user device is a smart wearable device such as, for example, a smartwatch 631.

Referring to FIG. 7A, the smartwatch 631 includes a touch-screen display 650 that can display one or more graphical icons 655a, 655b, 655c, and 655d. The graphical icons 655a-655d correspond to a respective software application (App) installed on the smartwatch 631. The smartwatch 631 is further configured to detect a physical touch applied to the touch-screen display 650. A given App can be fully launched by touching and releasing the corresponding graphical icon 655a-655d. The touching action can be performed using the user's finger or stylus, for example.

The touch-screen display 650 can work in conjunction with a secondary-touch detection system (see FIG. 4A) installed on the smartwatch 631 to distinguish between different touch actions that are physically applied to the touch-screen display 650 as described above. Accordingly, the smartwatch 631 can execute a specific action or contextually specific control in response to detecting the secondary-touch action.

Referring to FIG. 7B, for example, a first touching action is applied to the touch-screen display 650 to select the graphical icon 655d associated with a building access App. The first-touching action in this case, for example, is an applied touch having a first pressure force (P1). Although not illustrated, the smartwatch 631 can launch the full building access App if, for example, the first pressure force (P1) does not exceed a pressure force threshold ($P_{TH}$).

Turning to FIG. 7C, however, the touching action is applied at a greater pressure force (P2) which exceeds $P_{TH}$. Accordingly, the smartwatch 631 detects a secondary-touch action (i.e., a force touch) applied to the touch-screen displayed 660. In response to detecting the secondary-touch action, the smartwatch 631 automatically displays a pop-up service request user interface 660 associated with the building access App. Unlike a scenario where the building access App is fully launched, the pop-up service request user interface 660 is displayed on a partial area of the touch-screen display 660. For example, a first total area of the pop-up service request user interface 660 is less than a second total area of the display screen 660. Accordingly, information displayed in the background of the touch-screen display 660 can still be viewed while accessing the pop-up service request user interface 660.

Still referring to FIG. 7C, the pop-up service request user interface 660 is a condensed interface that provides a user with quick access to a limited number features of the building access App without the need to fully launch the App. Because the smartwatch 631 has a smaller display screen 650 compared to the display screen 550 of the smartphone 531 described above, a decreased number of selectable options 662a, 662b and 664 may be included in the pop-up service request user interface 660 compared to when operating the smartphone 631. In at least one embodiment, the pop-up service request user interface 660 lists at least one previously selected destination floor 662a, and 662b among the floors of a corresponding elevator system. A user can quickly tap and select a desired floor 662a or 662b from the pop-up interface 660. In response to the selecting the floor 662a or 662b, the smartwatch 631 outputs an elevator car call request to an elevator controller (not shown in FIGS. 7A and 7C). Although the pop-up service request user interface 660 is illustrated as including elevator floor information, other information may be provided by the pop-up service request user interface 660 such as, for example, a "Disarm" option as described.

Figure 8A:
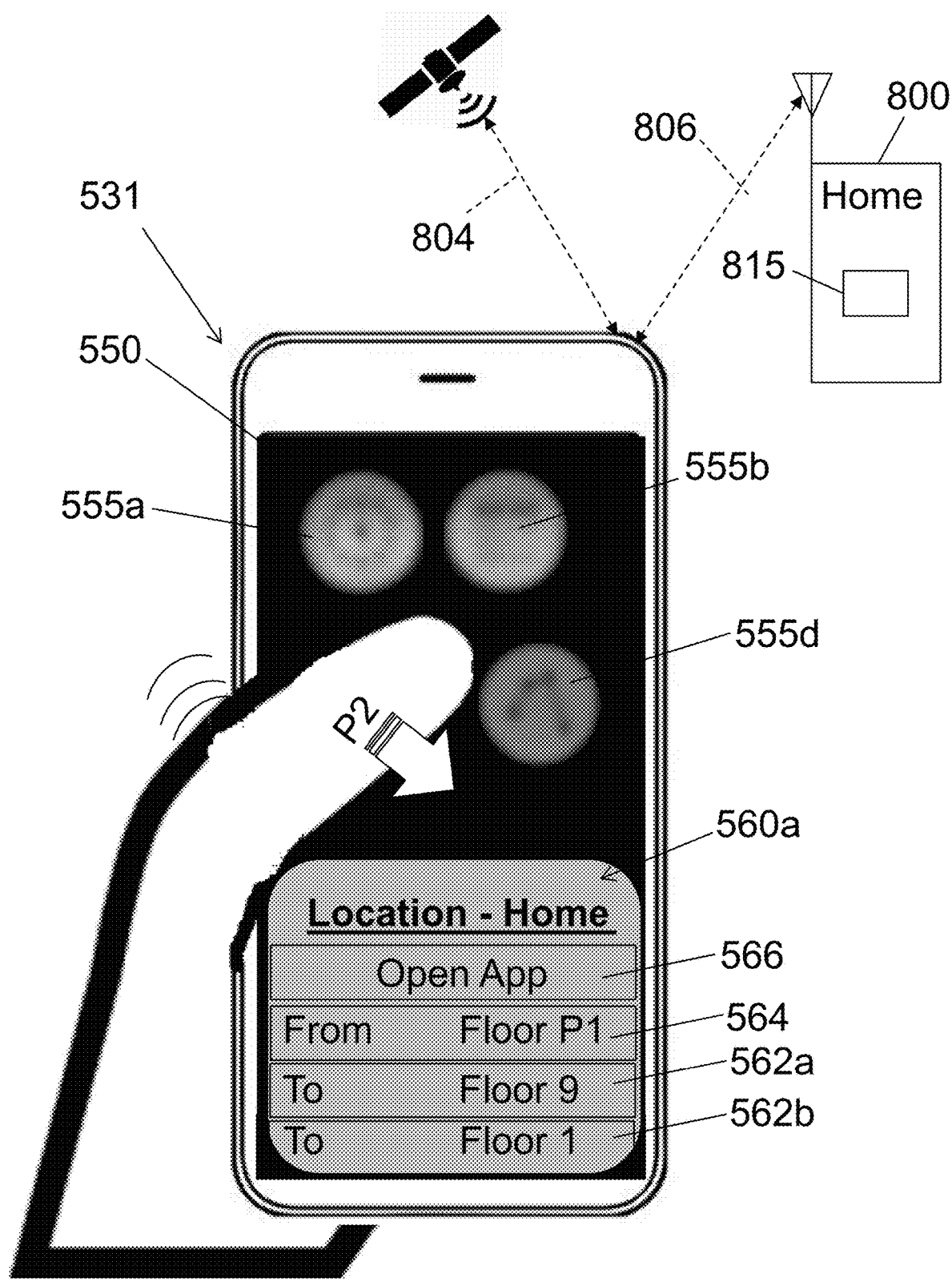
FIG. 8A illustrates an App pop-up interface that presents a user with a floor history when the user device is in the vicinity of a first elevator system according to a non-limiting embodiment.
Figure 8B:
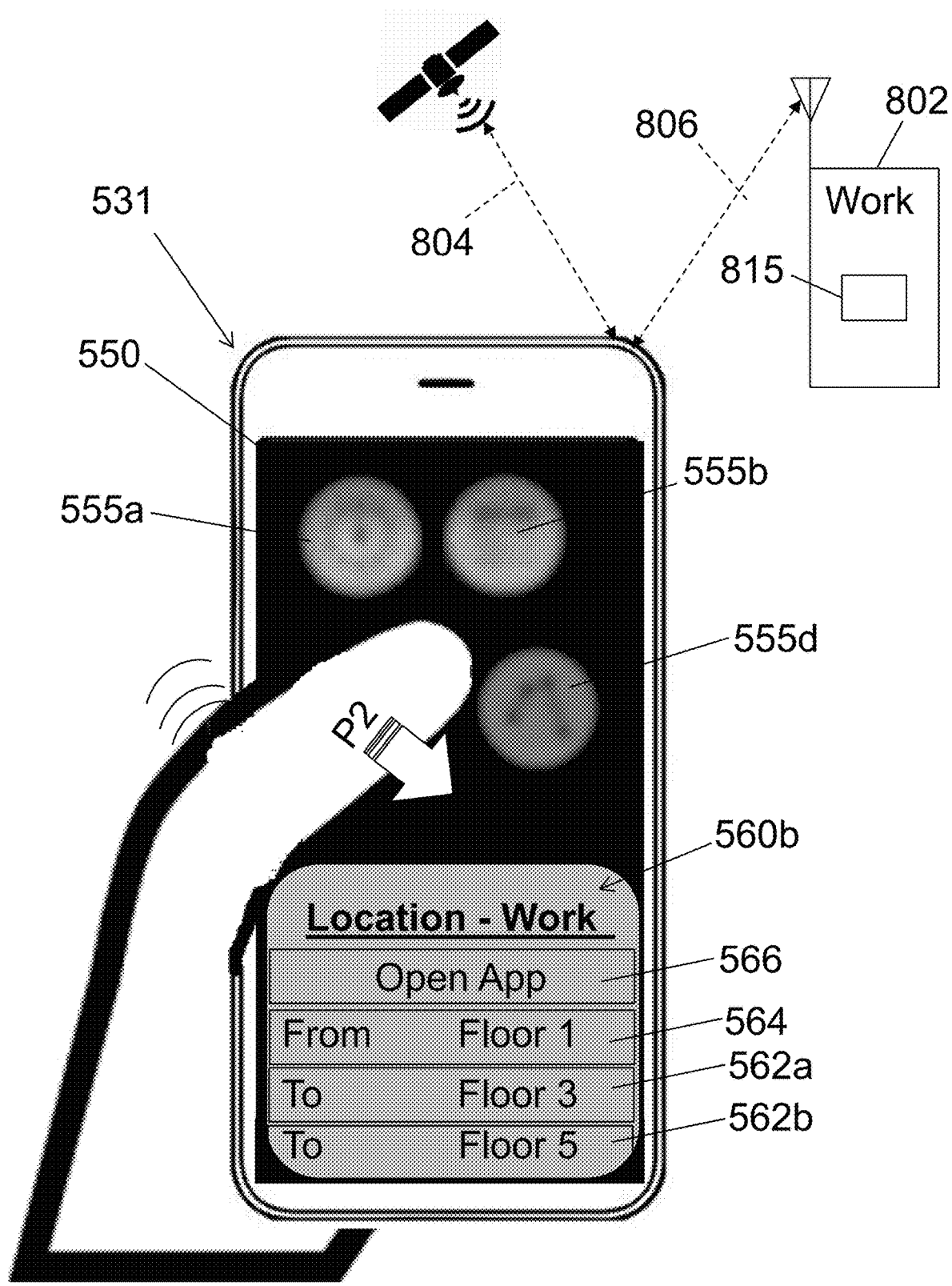
FIG. 8B illustrates an App pop-up interface that presents a user with a different floor history when the user device is in the vicinity of a different second elevator system according to a non-limiting embodiment.

Turning now to FIGS. 8A and 8B, a secondary-touch action interface configured to display a pop-up service request user interface 560a based on a current location of the mobile user device 531. Referring to FIG. 8A, for example, the mobile user device 531 determines that it is in the vicinity of the user's primary residence 800 such as a home or apartment complex. The mobile user device 531 can determine the first and second geographical locations based on several known location identification techniques including, but not limited to, global satellite position (GPS) information 804, a location acknowledgement (ACK) signal 806 output from an elevator controller 815, triangulation techniques, etc. When the secondary-touch action is detected, the mobile user device 531 performs functions associated with the nearby primary residence 800. For example, in response to detecting the secondary-touch action, the mobile user device 531 displays a pop-up service request user interface 560a that lists a floor history corresponding with the primary residence 800.

Turning to FIG. 8B, the mobile user device 531 detects that it is in the vicinity of the user's workplace 802 as opposed to the primary residence 800. Accordingly, when the secondary-touch action is detected, the mobile user device 531 performs functions associated with the workplace 802 as opposed to the primary residence 800. For example, in response to detecting the secondary-touch action, the mobile user device 531 displays a pop-up service request user interface 560b that lists a different floor history corresponding with the workplace 802 compared to the floor history corresponding to the primary residence 800.

Figure 9:
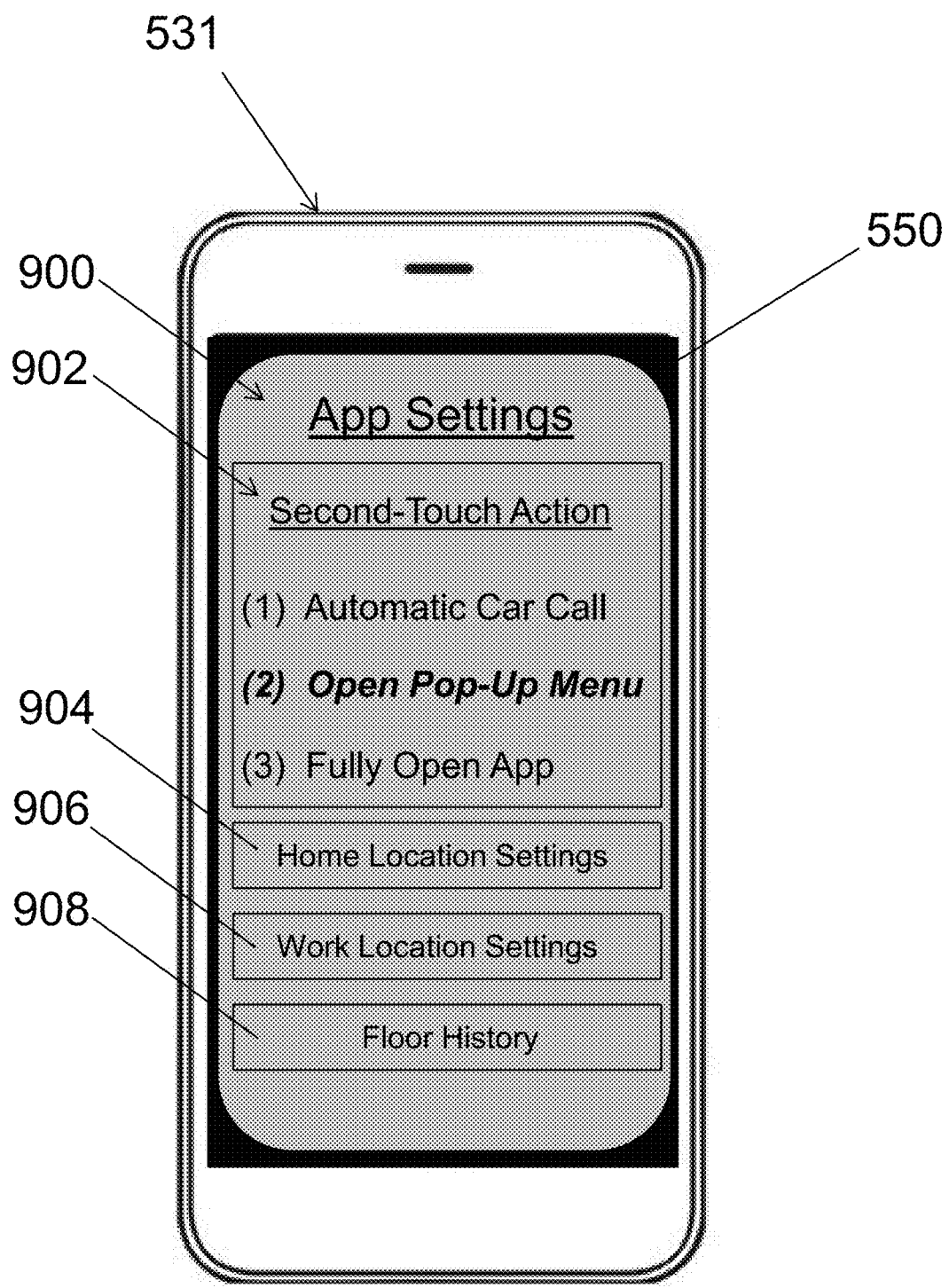
FIG. 9 illustrates an App setting menu is shown displayed on a user device according to a non-limiting embodiment.

Referring to FIG. 9, an App setting menu 900 is shown displayed on a mobile user device 531 after fully opening the App. The App setting menu 900 includes, for example, a second-touch action sub-menu 902, a home location sub-menu 904, a work location sub-menu 906, and a floor history sub-menu 908. The example illustrated in FIG. 9 shows the second-touch action sub-menu 902 operating as a pull-down menu that, when selected, displays additional selectable options. It should be appreciated that any of sub-menus 904, 906 and 908 can also operate as a pull-down menu.

The second-touch action sub-menu 902 allows a user to select the next operation performed by the mobile user device 531 in response to performing a secondary-touch action (e.g., a force touch or a long-press). In the example illustrated in FIG. 9, the mobile user device is set to display the pop-up service request user interface (as indicated by bold indicator) in response to detecting a secondary-touch action applied to the display screen 550. The user, however, can change the responsive action performed by the mobile user device 531 by selecting (e.g., touching) either the "automatic car call" option or the "fully open App" option. When the "automatic car call" option is selected, the mobile user device 531 will automatically call an elevator car to the current floor location of the mobile user device in response to detecting a secondary-touch action applied to the display screen 550. Similarly, when the "fully open App" option is selected, the mobile user device 531 will fully open the building access App installed on the mobile device in response to detecting a secondary-touch action applied to the display screen 550. Unlike the pop-up display interface, the fully opened App allows the user to access the full features of the building access App (e.g., the setting menu, full elevator history, etc.) which may be excluded from the condensed pop-up display interface.

It should be appreciated that additional secondary-touch action options may be included in the second-touch action sub-menu 902. For example, although not illustrated, the second-touch action sub-menu 902 may also include a security device disarm option, which when selected, commands the mobile user device 531 to output a disarm command signal for disarming one or more security devices (e.g., a locked door) in response to detecting a secondary-touch action applied to the display screen 550.

The home location sub-menu 904 allows a user to input location information indicating a primary residency such as, for example, an apartment complex containing an elevator system. The location information can include, but is not limited to, a mailing address and GPS coordinates. The mobile user device 531 can utilize the input home location information to detect when it is located at or near the user's primary residence, and perform operations corresponding to the primary residence in response to detecting a secondary-touch action applied to the display screen 550. For example, when the mobile user device 531 detects that it is located at or near the user's primary residence, the mobile device 531 can present a history of elevator destination floors corresponding to the user's apartment building (e.g., in response to detecting a secondary-touch action applied to the display 550) as opposed to a history of elevator destination floors corresponding to the user's workplace. In another example, the mobile phone can automatically unlock the user's apartment building door and/or automatically call an elevator car to the lobby of the user's apartment building in response to detecting a secondary-touch action applied to the display screen 550.

The work location sub-menu 906, is similar to the home location sub-menu 904 described above, but allows a user to input work location information indicating a workplace that includes an elevator system. The work location information can include, but is not limited to, a business mailing address and GPS coordinates. The mobile user device 531 can utilize the input work location information to detect when it is located at or near the user's workplace building. Accordingly, the mobile user device 531 can perform operations corresponding to the primary residence in response to detecting a secondary-touch action as opposed to the operations performed when the mobile user device 531 is located near or at the primary residence. For example, when the mobile user device 531 detects that it is located at or near the user's workplace, the mobile device 531 can present a history of elevator destination floors corresponding to the user's workplace building (e.g., in response to detecting a secondary-touch action applied to the display 550) as opposed to a history of elevator destination floors corresponding to the user's primary residence. In another example, the mobile phone can automatically unlock the user's workplace door and/or automatically call an elevator car to the lobby of the user's workplace building in response to detecting a secondary-touch action applied to the display screen 550.

Selecting the floor history sub-menu 908 displays a list of previously destination floors selected by the user via the building access App (e.g., using either the full opened App or the pop-up interface). The listing of previous floors may also include a time stamp indicating the time and day(s) at which the floors were selected. The floor history sub-menu 908 can also allow a user to delete one or more previously selected destination floors from the list.

Figure 10:
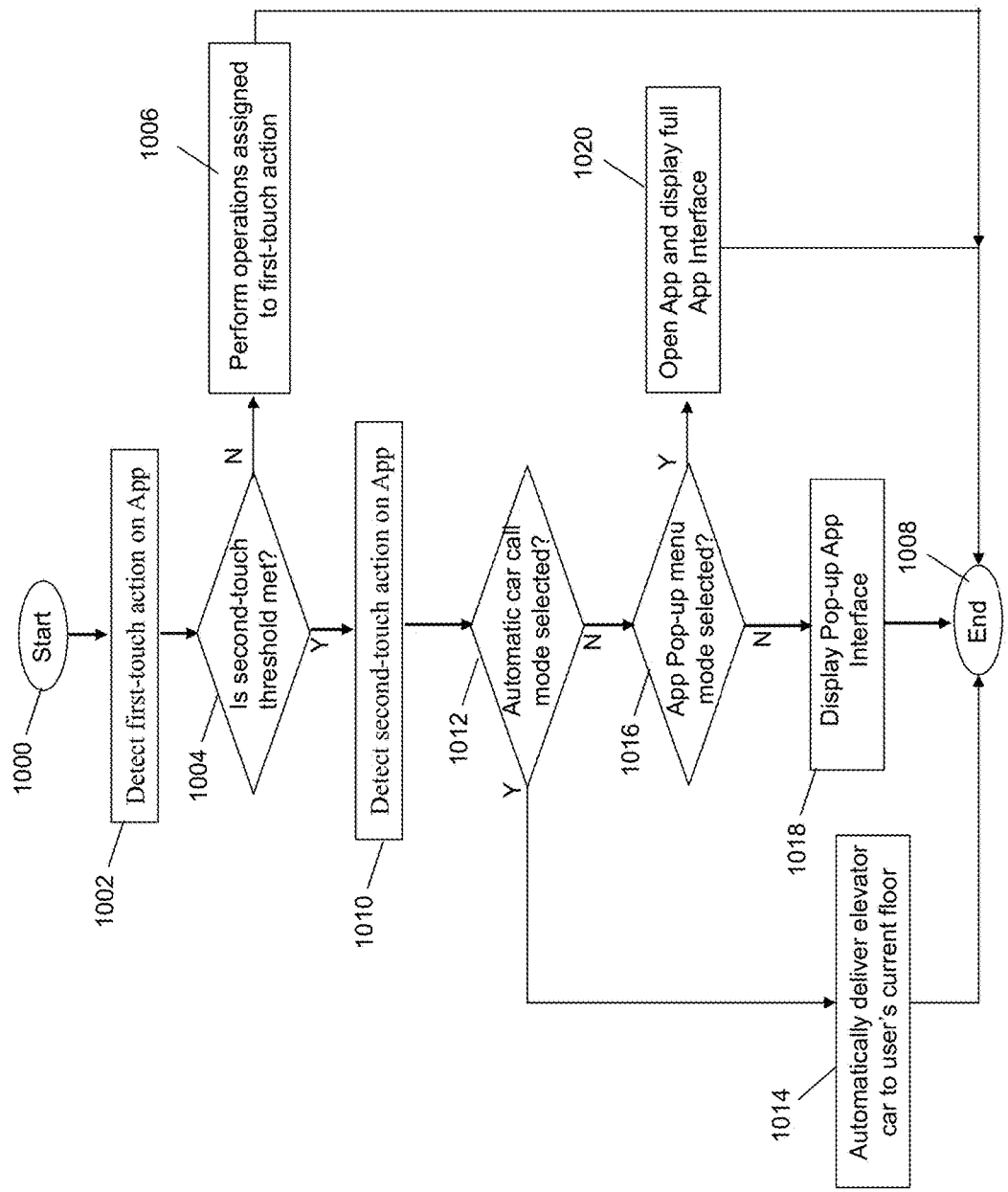
FIG. 10 is a flow diagram illustrating a method of operating a secondary-touch service request interface according to a non-limiting embodiment.

Turning to FIG. 10, a flow diagram illustrates a method of operating a secondary-touch service request interface of a building access App installed on a mobile user device according to a non-limiting embodiment. The method begins at operation 1000, and at operation 1002 a first-touch action is detected, which is applied to an App icon corresponding to the building access App. The first-touch action, for example, can include a touch and release action in which the App icon is briefly touched and then released. In response to the first touch action, a determination is made as to whether a second-touch threshold is met at operation 1004. The second-touch threshold can include, for example, increased applied pressure (e.g., a force press) or prolonged touching or contact with the App icon (e.g., a long press). When the second-touch threshold is not met, an operation assigned to the first-touch action is performed at operation 1006. In at least one non-limiting embodiment, the operation includes fully launching the building access App, which presents the user with App's full capabilities including, for example, larger screen display, increased listings of floor history, and App settings. After fully launching the building access App, the method ends at operation 1008.

When the second-touch threshold is met at operation 1004, a second-touch action applied to the App icon is detected at operation 1010. Once the second-touch action is detected, the user settings of the building access App are analyzed to determine the next responsive operation at operation 1012. The next responsive action includes, for example, launching the pop-up service request user interface, automatically calling an elevator car, automatically disarming a security device, etc.

For example, a determination is made at operation 1012 as to whether an automatic car request mode is assigned to the second-touch action. When the automatic car request mode is assigned, an elevator car is automatically delivered to user's current floor at operation 1014, and the method ends at operation 1008.

When, however, the automatic car request setting is not assigned, the method determines whether a pop-up service request interface mode is assigned to the second-touch action at operation 1016. When the pop-up service request interface mode is assigned, the pop-up service request user interface is displayed on the user device display at operation 1018, and the method ends at operation 1008. Unlike the fully launched building access App which provides the user full access to the App's features, the pop-up service request user interface provides a user with quick access to limited features of the App without the need to fully launch the building access App.

When the pop-up service request interface mode is not assigned, the building access App can perform a default operation at operation 1020. For example, the mobile user device can fully launch the building access App and display the full interface corresponding to the building access App at operation 1020. Once the building access App is fully launched, the method ends at operation 1008.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An elevator control system comprising:
  an elevator system including at least one elevator car configured to travel to a plurality of floors;
  an electronic controller configured to control the elevator system to deliver the elevator car to a given floor among the plurality floors in response to an elevator car request; and
  an electronic mobile user device in signal communication with the controller, the electronic mobile device including a display screen and installed with a secondary-touch detection system configured to detect a first touch action applied to the display screen and a second touch action applied to the display screen,
  wherein the mobile user device launches a full service request user interface in response to detecting the first touch action, and performs at least one of launching a pop-up service request user interface and automatically communicates the elevator car request to the controller in response to detecting the second touch action.

2. The elevator control system of claim 1, wherein the first touch action is at least one of touching and releasing of the display screen, and a first pressure force applied to the display screen that is less than or equal to a pressure force threshold, and wherein the second touch action is a second pressing force applied to the display screen that exceeds the pressure force threshold.

3. The elevator control system of claim 1, wherein the first touch action is at least one of touching and releasing of the display screen, and a touch applied to the display screen that is less than or equal to a touching time threshold, and wherein the second touch action is a touch applied to the display screen that exceeds the touch time threshold.

4. The elevator control system of claim 1, wherein the pop-up service request user interface is displayed on a partial area of the display screen.

5. The elevator control system of claim 4, wherein a first total area of the pop-up service request user interface is less than a second total area of the display screen.

6. The elevator control system of claim 1, wherein the pop-up service request user interface lists at least one previously selected destination floor among the plurality of floors.

7. The elevator control system of claim 6, wherein the controller commands the requested elevator car to a previously selected destination floor selected by the user via the pop-up service request user interface.

8. The elevator control system of claim 7, wherein the controller is in signal communication with a security device, and wherein the pop-up service request user interface displays a selectable security disarming graphical indicator.

9. The elevator control system of claim 7, wherein the mobile device sends a disarm request to disarm the security device in response to selecting the security disarming graphical indicator from the pop-up service request user interface, and wherein the controller outputs a disarm command signal that automatically disarms the security device in response to receiving the disarm request.

10. The elevator control system of claim 2, wherein the controller automatically receives a current floor location of the mobile user device, and wherein the mobile user device requests delivery of the at least one elevator car to the current floor location in response to detecting the second touch action.

11. The elevator system of claim 10, wherein a most recent destination floor is detected by the mobile user device, and the current floor location is automatically set to the most recent destination floor in response to launching the pop-up service request user interface.

12. The elevator control system of claim 1, wherein the mobile device is at least one of a smart phone and a smart wearable device.

13. A mobile user device comprising:
  a display screen; and
  a secondary-touch detection system configured to detect a first touch action applied to the display screen and a second touch action applied to the display screen,
  wherein the mobile user device launches a full service request user interface in response to detecting the first touch action, and in response to detecting the second touch action performs at least one of launching a pop-up service request user interface and automatically communicating an elevator car request to a controller configured to command delivery of at least one elevator car to a given floor among the plurality.

14. The mobile user device of claim 12, wherein the first touch action is at least one of touching and releasing of the display screen, and a first pressure force applied to the display screen that is less than or equal to a pressure force threshold, and wherein the second touch action is a second pressing force applied to the display screen that exceeds the pressure force threshold.

15. The mobile user device of claim 12, wherein the first touch action is at least one of touching and releasing of the display screen, and a touch applied to the display screen that is less than or equal to a touching time threshold, and wherein the second touch action is a touch applied to the display screen that exceeds the touch time threshold.

16. The mobile user device of claim 12, wherein the pop-up service request user interface is displayed on a partial area of the display screen, and wherein the pop-up service request user interface displays at least one previously selected destination floor among the plurality of floors.

17. The mobile user device of claim 16, wherein the displayed at least one previously selected destination floor is based on a current location of the mobile user device.

18. The mobile user device of claim 17, wherein the mobile device displays a first previously selected floor included in a first building when the mobile device is located at a first geographical location, and wherein the mobile device displays a second previously selected floor included in a second building when the mobile device is located at a second geographical location different from the first geographical location.

19. The mobile user device of claim 18, wherein the mobile user device determines the first and second geographical locations based on at least one of global satellite position (GPS) information and a location acknowledgement (ACK) signal output from an elevator controller included in the first and second buildings.

20. A method of communicating an elevator car request, the method comprising:
   physically touching a display screen installed on an electronic mobile device;
   detecting, via a secondary-touch detection system installed on the mobile user device, at least one of a first touch action applied to the display screen and a second touch action applied to the display screen,
   launching, via an electronic controller installed on the mobile device, a full service request user interface in response the first touch action; and
   performing at least one of launching, via the controller, a pop-up service request user interface and automatically communicating, via the controller, the elevator car request to an electronic elevator controller configured to command delivery of an elevator car to a requested floor among a plurality floors according elevator car request.

* * * * *